US012125081B2

(12) United States Patent
Hagen et al.

(10) Patent No.: US 12,125,081 B2
(45) Date of Patent: Oct. 22, 2024

(54) SHOPPING CART WITH SOUND-BASED VALIDATION

(71) Applicant: Target Brands, Inc., Minneapolis, MN (US)

(72) Inventors: Todd A. Hagen, Minneapolis, MN (US); Andrew Wipf, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 269 days.

(21) Appl. No.: 17/963,788

(22) Filed: Oct. 11, 2022

(65) Prior Publication Data

US 2023/0146179 A1 May 11, 2023

Related U.S. Application Data

(60) Provisional application No. 63/340,788, filed on May 11, 2022, provisional application No. 63/276,462, filed on Nov. 5, 2021.

(51) Int. Cl.
  *G06Q 30/0601* (2023.01)
  *G01P 3/00* (2006.01)
  *H04R 1/02* (2006.01)
  *H04R 1/08* (2006.01)

(52) U.S. Cl.
  CPC ............ *G06Q 30/0609* (2013.01); *G01P 3/00* (2013.01); *G06Q 30/0633* (2013.01); *H04R 1/028* (2013.01); *H04R 1/08* (2013.01)

(58) Field of Classification Search
  None
  See application file for complete search history.

(56) References Cited

U.S. PATENT DOCUMENTS

| 9,668,073 | B2 * | 5/2017 | Das | G10L 99/00 |
| 9,953,388 | B2 * | 4/2018 | Jones | G10L 25/51 |
| 10,176,647 | B2 | 1/2019 | Gonzales | |
| 10,229,699 | B2 * | 3/2019 | Jones | G06Q 10/087 |
| 10,600,043 | B2 * | 3/2020 | Chaubard | G06Q 20/208 |

(Continued)

OTHER PUBLICATIONS

Anon., "Orange (ORA) issued patent titled 'Adjustment control for one or more devices'," News Bites—Telecommunications [Melbourne] Apr. 14, 2021. (Year: 2021).*

(Continued)

*Primary Examiner* — Nicholas D Rosen
(74) *Attorney, Agent, or Firm* — Barnes & Thornburg LLP

(57) ABSTRACT

In some implementations, a system for validating products that are placed in a shopping cart includes a shopping cart configured to retain products and to be operated by a user in a retail environment. The shopping cart includes product validation hardware and a controller. The product validation hardware includes motion sensors positioned along a top perimeter of the shopping cart and at least one sound sensor positioned inside the shopping cart. The shopping cart is configured to receive, from the motion sensors, motion data when a product enters a top horizontal plane of the shopping cart, and to receive, from the sound sensor, audio data that is collected in real-time as the product is placed in the shopping cart. An audio signature is generated for the product, and is used to validate the product that is placed in the shopping cart.

20 Claims, 11 Drawing Sheets

(56) References Cited

U.S. PATENT DOCUMENTS

| | | | |
|---|---|---|---|
| 10,635,936 B2 | 4/2020 | Tullberg et al. | |
| 10,824,984 B2 | 11/2020 | Goja | |
| 10,915,862 B2* | 2/2021 | Long | G06K 11/00 |
| 10,915,936 B1* | 2/2021 | Vora | G07G 3/00 |
| 10,978,092 B2* | 4/2021 | Ottogalli | G10L 25/51 |
| 11,636,457 B1* | 4/2023 | De Bonet | G06Q 20/204 |
| | | | 705/23 |
| 11,935,374 B2* | 3/2024 | Hagen | G07G 1/009 |
| 2008/0243626 A1 | 10/2008 | Stawar et al. | |
| 2016/0125348 A1* | 5/2016 | Dyer | G06Q 10/08 |
| | | | 705/7.42 |
| 2017/0105080 A1 | 4/2017 | Das et al. | |
| 2017/0162215 A1* | 6/2017 | Jones | G10L 25/51 |
| 2017/0186124 A1* | 6/2017 | Jones | G10L 25/51 |
| 2018/0089913 A1* | 3/2018 | Gonzales, Jr. | G07C 5/006 |
| 2018/0218351 A1* | 8/2018 | Chaubard | G07G 1/0081 |
| 2019/0005353 A1* | 1/2019 | Tullberg | G06F 18/214 |
| 2019/0287061 A1* | 9/2019 | Goja | G07D 11/0093 |
| 2020/0005809 A1* | 1/2020 | Ottogalli | G08C 17/02 |
| 2021/0012283 A1* | 1/2021 | Long | G06K 11/00 |
| 2022/0157134 A1* | 5/2022 | Sriraman | G07G 1/0072 |
| 2022/0198550 A1* | 6/2022 | Meidar | G06Q 20/20 |
| 2023/0147385 A1* | 5/2023 | Hagen | G01G 19/4144 |
| | | | 705/23 |
| 2023/0368216 A1* | 11/2023 | Hagen | G06Q 30/0185 |

OTHER PUBLICATIONS

Antonacci et al., "Audio-based object recognition system for tangible acoustic interfaces," IEEE International Workshop on Haptic Audio visual Environments and Games, 2009, 6 pages.

Gandhi et al., "Swoosh! Rattle! Thump!—Actions that Sound," arXiv preprint arXiv:2007.01851, 2020, 10 pages.

* cited by examiner

SHOPPING CART WITH SOUND-BASED VALIDATION

CROSS-REFERENCE TO RELATED APPLICATIONS

This application claims priority to U.S. Provisional Application Ser. No. 63/340,788, filed on May 11, 2022 and U.S. Provisional Application Ser. No. 63/276,462, filed on Nov. 5, 2021, the disclosures of which are incorporated by reference in their entirety.

TECHNICAL FIELD

This document generally describes devices, systems, and methods related to validating aspects of items as they added to or removed from a shopping cart.

BACKGROUND

Guests (e.g., customers or other users) can go to retail environments, such as stores, to purchase products. A guest can load a shopping cart with the products they wish to purchase. When they are done collecting those products, the guest can go to a checkout lane to complete the transaction process and leave the retail environment.

Retail checkout may occur at checkout lanes where an employee scans product identifiers for every product the guest wants to purchase. Retail checkout may also occur at self-checkout lanes/stations where the guest, instead of the retail employee, scans product identifiers for every product the guest wants to purchase. The retail employee's role can change such that the retail employee may divide their attention across overseeing (e.g., reviewing) multiple self-checkout lanes/stations in the retail environment. Sometimes, the retail employee may not notice if a guest intentionally or unintentionally leaves the retail environment with a product that they did not scan at the self-checkout lanes, especially since the retail employee's attention is divided over multiple self-checkout lanes.

Some retail environments have permitted guests to use scan and go technology on their mobile devices (e.g., smartphones) to complete retail checkout in the retail environment instead of at a checkout lane or self-checkout lane. Scan and go technology can move the product scanning process further away from review of retail employee(s). Some scan and go systems have used employees to manually check and verify whether the guest is leaving the store with only those items scanned and purchased on their mobile device before exiting the retail environment.

SUMMARY

The document generally relates to technology for automatically validating aspects of products (e.g., items) that are added to or removed from a shopping cart in a retail environment (e.g., a store). For example, the disclosed technology can use signals from sound sensors (e.g., one or more microphones) that are included as part of (or otherwise affixed to) a shopping cart to determine whether a product added to the shopping cart corresponds a product that is expected to be placed in the cart, such as a product that was recently scanned on a mobile device. If the signals from the sound sensors matches or otherwise corresponds to an expected product (i.e., scanned product), then the physical product placed in the cart can be validated as the expected product. However, if the signals do not match or do not otherwise correspond to the expected product, then the physical product placed in the cart is not validated, which can result in one or more subsequent actions (e.g., request for rescan of product, request for checkout at point of sale terminal, etc.). The disclosed technology can perform near instantaneous evaluations using sound sensor signals (and without having to wait for the sensor signals to settle out) by analyzing real-time changes in sound (e.g., audio spikes or fluctuations) over time with expected sounds and/or other sensor data, such as motion of the products as they are added to (or removed from) the cart.

The disclosed technology can be used in combination with and to improve mobile device-based scanning of items and checkout processes, such as scan and go checkout systems. For example, existing scan and go technology presents a variety of problems, including guests potentially placing a different item into their shopping cart than the item that was scanned, and misidentifying a quantity of products that was scanned versus taken, both of which can result in shortages for the retailer. Additionally, manual checks to ward against shortages with scan and go checkouts can present a variety of drawbacks, such as slowing down the checkout/departure process (mitigating some of the benefits of using scan and go technology), increasing labor costs for dedicated manually checkers, and potentially failing to remedy these issues due to potential human error during the checking process. The disclosed technology can resolve these and/or other problems with scan and go type systems. For example, the disclosed technology can provide for more accurate, granular, and efficient validation of scanned items as shopping progresses—meaning verifying that the physical item added to a shopping cart is the item that was scanned (and in the same quantity as recorded as part of the scan). This can provide a variety of benefits, such as reducing shortages and other inconsistencies between the physical goods that a guest leaves with and those that the guest pays for during the checkout process. For example, a guest may only be presented with an option to checkout on their mobile device if each scanned item has been validated by the shopping cart, and may otherwise be directed to physical checkout lanes if there are inconsistencies between the scanned items and the physical items in the cart. This can permit for guests with fully validated carts to more quickly and readily checkout, can reduce the manual effort to manage such checkout processes for retailers, and can provide for greater levels of trust between retailers and guests using scan and go type systems, which can increase the prevalence and availability of such systems for guests across retail environments.

As part of the disclosed technology, a shopping cart can include different types of sensors such as sound sensors. The shopping cart can also include motion sensors or other optical flow sensors. The shopping cart can also include a controller that can perform the disclosed techniques. In some implementations, validating a product that is added to the cart can be performed by a guest's mobile device instead of or in combination with the cart's controller or another computing system. The sound sensors can detect immediate changes in sound, or spikes in loudness, as products are placed in the cart. The detected spikes can be analyze in real-time (or near real-time) to differentiate between products and/or quantities of products that are added to (or removed from) the cart. Immediate audio data that is measured in the cart by the sound sensors while a guest pushes the cart around the retail environment can be used to make faster validation (e.g., verification) determinations about what the guest is purchasing. In other words, audio data can be correlated in real-time with other sensor data, such as motion data, to determine whether the products scanned by the guest's mobile device match (or are sufficiently close to) the products that are placed in the cart. One or more machine learning trained models can be used to correlate the various sensor data and validate the product.

Detected audio data can be compared to expected audio data for a product that is scanned by the mobile device. If the detected audio data is within a predetermined threshold range of the expected audio data, then the product can be validated. If the detected audio data is not within the predetermined threshold range of the expected audio data, then the product may not be validated. If the product is not validated, the guest can receive a notification at their mobile device requesting that they scan the correct product(s) and/or put the correct scanned product(s) in the cart.

One or more other collected data, such as motion data when the product is being added to or removed from the cart, can be correlated with the audio data and used to validate the product. For example, motion sensors and/or optical flow sensors on the cart can detect a speed at which the product enters the cart. The speed can be correlated with other signals such as the immediate sound measurements of the product being added to the cart to validate whether the product entering the cart is the product that was scanned by the guest's mobile device (e.g., the expected product). As an illustrative example, a product that is thrown into the cart or dropped into the cart can be expected to produce a louder sound than a product that is slowly placed in the cart with both the guest's hands. If the product that is thrown into the cart or the product that is slowly placed in the cart does not match the audio data for the expected product, then the guest can be notified that the product added to the cart is not validated.

Validating the product means that the guest can complete their transaction while in the retail environment and at their mobile device. As a result, the guest can walk out of the retail environment with the cart full of validated products and a completed transaction instead of waiting in line to complete a traditional checkout process at a checkout lane or station.

One or more embodiments described herein can include a system for validating products that are placed in a shopping cart. In some implementations, the system can include a shopping cart configured to retain one or more products and to be operated by a user in a retail environment. The shopping cart can include product validation hardware and a controller. The product validation hardware can include a plurality of motion sensors positioned at least along a top perimeter of the shopping cart and at least one sound sensor positioned inside the shopping cart. The shopping cart can be configured to perform operations comprising: receiving, from one or more of the plurality of motion sensors, motion data when a product enters a top horizontal plane of the shopping cart; receiving, from the at least one sound sensor, audio data that is collected in real-time as the product is placed in the shopping cart; and correlating the audio data with the motion data to generate an audio signature over time for the product, wherein the audio signature is used to validate the product that is placed in the shopping cart.

These and other implementations may include any, all, or none of the following features. The system can include a mobile device in communication with at least one of the product validation hardware and the controller of the shopping cart. The mobile device can be configured to perform operations including receiving user input indicating a scan of the product to be placed in the shopping cart; identifying a unique identifier for the product based on the scan; and retrieving, from a data store and based on the unique identifier, product information for the product. The product information can include information that identifies one or more expected audio signatures for the product. The mobile device can be configured to perform operations including receiving, from the shopping cart, the audio signature over time for the product; comparing the audio signature to at least one expected audio signature of the one or more expected audio signatures for the product to determine whether the audio signature is within a predetermined threshold range of the at least one expected audio signature; and generating, based on determining that the audio signature is within the predetermined threshold range of the at least one expected audio signature, output indicating that the product placed in the shopping cart is validated. Comparing the audio signature to the at least one expected audio signature can include comparing a measured amplitude of the audio signature for a time interval and a frequency bin, with a corresponding expected amplitude of the audio signature for the time interval and the frequency bin. The mobile device can be configured to transmit, to the shopping cart, the product information of the product, and the shopping cart can be configured to perform operations including comparing the audio signature to at least one expected audio signature of the one or more expected audio signatures for the product to determine whether the audio signature is within a predetermined threshold range of the at least one expected audio signature; and generating, based on determining that the audio signature is within the predetermined threshold range of the at least one expected audio signature, output indicating that the product placed in the shopping cart is validated. The shopping cart can be configured to poll the at least one sound sensor for audio data based on receiving the motion data from the one or more of the plurality of motion sensors.

In some implementations, the system can include a shopping cart configured to retain one or more products and to be operated by a user in a retail environment. The shopping cart can include product validation hardware and a controller. The product validation hardware can include a plurality of motion sensors positioned at least along a top perimeter of the shopping cart and at least one sound sensor positioned inside the shopping cart; and a mobile device in communication with at least one of the product validation hardware and the controller of the shopping cart. The mobile device can be configured to perform operations including receiving user input indicating a scan of a product to be placed in the shopping cart; identifying a unique identifier for the product based on the scan; retrieving, from a data store and based on the unique identifier, product information for the product; and transmitting, to the controller, the product information. The controller of the shopping cart can be configured to perform operations including receiving, from the mobile device, the product information; receiving, from one or more of the plurality of motion sensors, motion data when the product enters a top horizontal plane of the shopping cart; receiving, from the at least one sound sensor, audio data that is collected in real-time as the product is placed in the shopping cart; correlating the audio data with the motion data to generate correlated data; comparing the correlated data to the product information of the product to determine whether the correlated data is within a predetermined threshold range of the product information; and generating, based on determining that the correlated data is within the predetermined threshold range of the product information, output indicating that the product placed in the shopping cart is validated.

These and other implementations may include any, all, or none of the following features. Correlating the audio data with the motion data can include determining a velocity of the product based on the motion data. The motion data can include at least one of position translation data, rotational data, and movement data of the product as it enters the shopping cart and settles inside the shopping cart. The correlated data can be generated based on applying a machine learning trained model to the audio data and the motion data. The model can be trained using a process including receiving training data for one or more other products that includes audio data, motion data, other sensor data, and positive product data correlations; training the model to correlate the received training data for the one or more other products; and outputting the model for runtime use. The product information can include information that identifies an expected audio signature for the product. Correlating the audio data with the motion data to generate correlated data can include adjusting the audio data based on the expected audio signature for the product. The motion data can be received at a first time and the audio data can be received at a second time. The controller can be configured perform operations including polling the at least one sound sensor for audio data based on receiving the motion data from the one or more of the plurality of motion sensors. The mobile device can be configured to perform operations including receiving the output indicating that the product placed in the shopping cart is validated; and receiving user input indicating a scan of another product that is to be placed in the shopping cart. The mobile device can be configured to perform operations including receiving the output indicating that the product placed in the shopping cart is validated; and completing a checkout process at the mobile device. The controller can be configured to perform operations including generating output indicating that the product placed in the shopping cart is not validated, based on determining that the correlated data is not within the predetermined threshold range of the product information. The output can be used for presenting a notification to the user at the mobile device. The notification can prompt the user to (i) rescan the product that was placed in the shopping cart or (ii) put a correct product that corresponds to the product in the shopping cart. The controller can be configured to perform operations including generating instructions that, when executed at the mobile device, prevent the user from continuing to scan products with the mobile device until the product that was placed in the shopping cart is validated, based on determining that the correlated data is not within the predetermined threshold range of the product information. The mobile device can be configured to perform operations including identifying the unique identifier for the product, based on the scan; and transmitting the unique identifier to the controller. The controller can be configured to perform operations including retrieving, from the data store and based on the unique identifier, the product information for the product. The mobile device can be configured to perform operations including receiving the correlated data from the controller and comparing the correlated data to the product information of the product to determine whether the correlated data is within the predetermined threshold range of the product information.

Other implementations of these aspects include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The devices, system, and techniques described herein may provide one or more of the following advantages. For example, detection and analysis of immediate sound changes in a shopping cart can provide fast, real-time validation determinations to be made about what products and quantities of products are put in the cart. Validation determinations can be accurately made in real-time without having to wait until a product settles in the cart. Fast and accurate product validation can also allow for a fast and seamless checkout process. The guest, therefore, can complete the checkout process from their mobile device and simply walk out of the retail environment with the purchased products in their cart instead of having to wait in line to complete a traditional checkout process at a checkout station or lane.

As mentioned above, the transaction can be completed in real-time at the guest's mobile device instead of at a checkout lane/station since the disclosed techniques can provide for ensuring product class and quantity correctness for the purpose of accurately charging the guest for the products placed in the cart. The disclosed techniques can also provide for ensuring deduction of a correct product class and quantity from inventory tracking systems in order to automatically, and in real-time, trigger replenishment and/or reorder workflows in the retail environment.

The disclosed techniques can also leverage machine learning techniques, such as machine learning trained models, to correlate different sensor signals (e.g., sound, motion, etc.) and validate products that are added to the cart in real-time. This can provide for fast and accurate determinations about whether the guest is putting the expected product, and quantity of the product, in the cart.

As another example, the disclosed techniques can be used for identifying product shortages in the retail environment and quickly addressing those shortages. For example, the disclosed techniques can provide for determining if and when a guest places a product in the cart that does not match a product scanned by the guest's mobile device. Such determinations can be flagged as potentially suspicious activity, such as ticket switching. The guest can be notified to place the correct product in their cart. Retail environment employees (e.g., in-store employees) may also be notified about the potentially suspicious activity. The employees can monitor the guest and/or approach the guest before they leave the retail environment to verify the products that the guest is purchasing. Thus, the retail environment employees and other relevant stakeholders/users can become aware of product shortages and can take steps to address those shortages.

As yet another example, the disclosed techniques can be economical to implement in quantity across many retail environments. The sound, motion, and other sensors deployed on a shopping cart can be low cost components having low power and processing consumption. The disclosed techniques can reduce computational complexity, use of computational resources, and power consumption compared to approaches that leverage high resolution video and/or depth signals to perform 3D product modeling. Moreover, the low cost components can be easily replaced or otherwise repaired if such components require servicing.

Similarly, the disclosed techniques can leverage processing power of the cart controller and/or the guest's mobile device to validate products in real-time. By leveraging processing power of the car controller and/or the guest's mobile device, for example, computing resources of a central computing system of the retail environment (and/or a network of the retail environment) can be conserved. Further, processing by the cart controller and/or by the mobile device can be efficient and can help avoid clogging network bandwidth. Reduction in sensor and computing requirements can also reduce power consumption. Reduced processing and power consumption can therefore result in quick validation determinations being made while conserving resources, and an improved, expedited retail checkout process for the guest.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to validating products (e.g., items) that are added to a shopping cart in a retail environment (e.g., store). More specifically, a guest can scan a product with their mobile device and then put the product in their cart. The disclosed techniques can provide for detecting sudden sound changes and other sensory signals as the product is added to (or removed from) the cart. The detected sounds and sensory signals can be correlated and compared to expected data associated with the scanned product. If the correlated data matches or is similar to (e.g., within a predetermined threshold range of) the expected data, the product added to the cart can be validated. If the correlated data does not match or is not similar to the expected data, the product may not be validated. One or more of the disclosed techniques of data collection, correlation, analysis, and product validation can be performed by various devices and/or computing systems, including but not limited to a cart controller and the guest's mobile device. Performing one or more of the disclosed techniques at the guest's mobile device, for example, can advantageously leverage the mobile device's processing power for fast and accurate validation determinations. As a result, the guest can experience a fast, seamless, and efficient checkout process at their mobile device instead of having to wait in line to complete a traditional checkout process at a checkout lane or station.

Figure 1A:
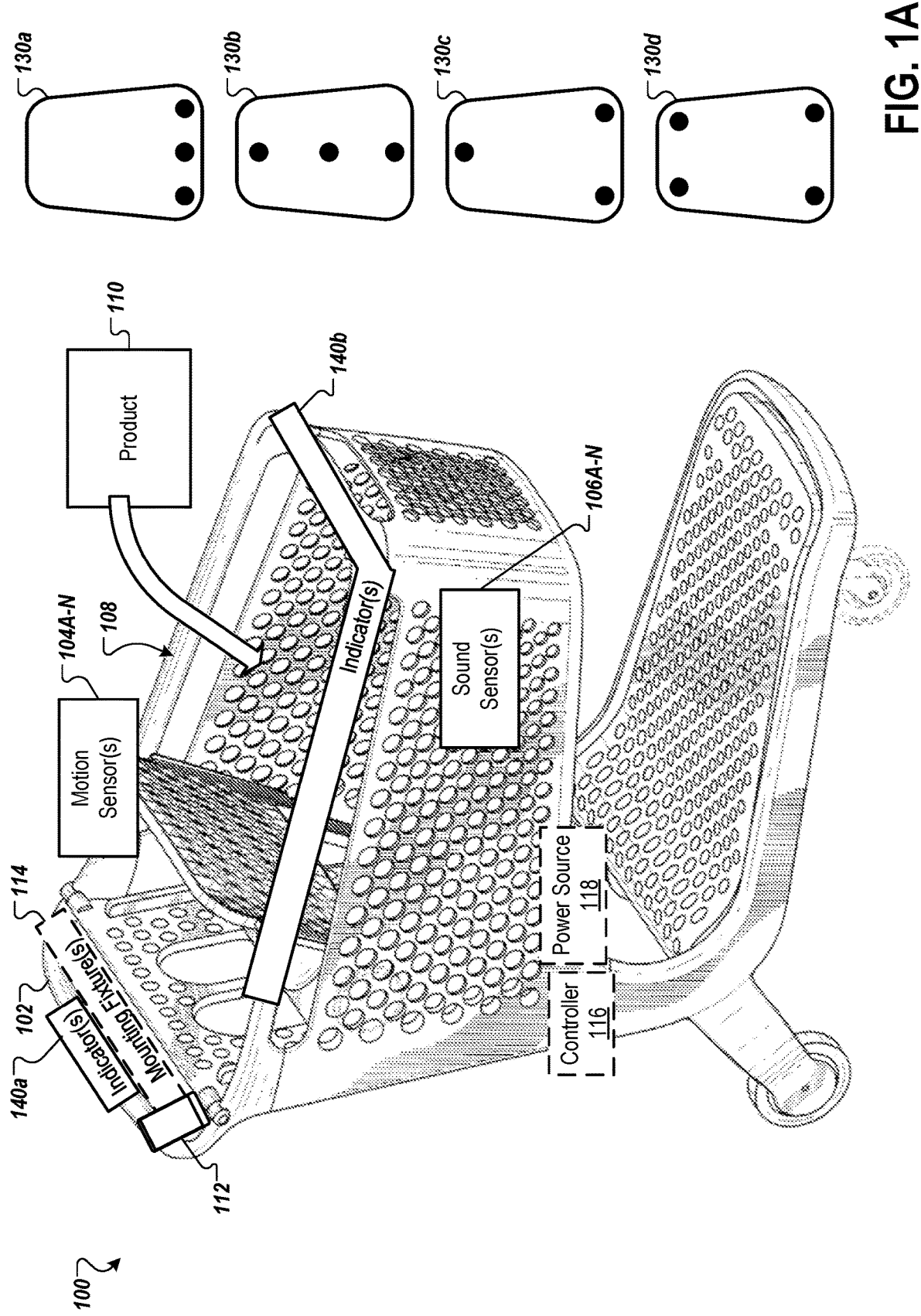
FIGS. 1A-B illustrate conceptual diagrams of a shopping cart that can implement sound-based validation techniques described herein to validate products as they are added to or removed from the shopping cart.
Figure 1B:
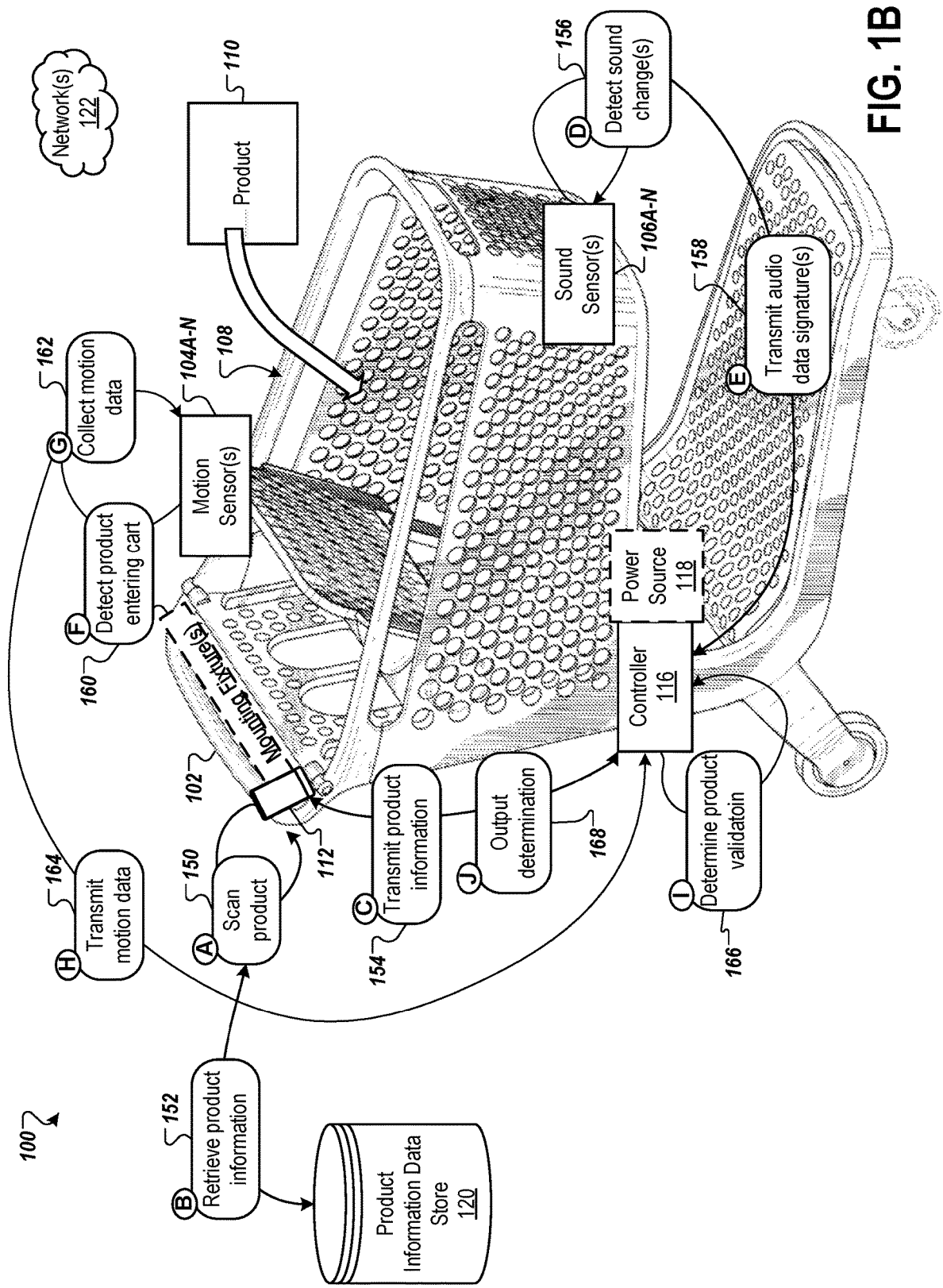

Referring to the figures, FIGS. 1A-B illustrate conceptual diagrams of a shopping cart 100 that can implement sound-based validation techniques described herein to validate products as they are added to or removed from the shopping cart 100. As shown in FIG. 1A, the shopping cart 100 can be a smart cart. In some implementations, the shopping cart 100 can be a preexisting shopping cart in the retail environment that has been modified/updated to include one or more components used for performing the sound-based validation techniques described herein. Since the components used for sound-based validation can be low cost, it can be easy and less expensive to modify existing shopping carts in the retail environment with the components.

The shopping cart 100 can include an optional mounting fixture(s) 114 near a handle 102 of the cart 100, motion sensors 104A-N, sound sensor(s) 106A-N (e.g., one or more microphones), an optional controller 116, an optional power source 118, and optional indicators 140a-b. The mounting fixture(s) 114 can have a housing or other configuration that can removably receive a mobile device 112 (e.g., smart phone, mobile phone, cellphone, tablet, etc.) of a user, such as a guest or customer in the retail environment. The housing or other configuration can be sized to fit mobile devices of varying sizes. The mounting fixture(s) 114 can also be located at one or more other regions of the shopping cart 100 to facilitate ease of access, attachment, and removal of the mobile device 112 from the shopping cart 100.

The motion sensor(s) 104A-N can be configured to collect motion data of product 110 when it is added to or removed from the cart 100. The motion sensor(s) 104A-N can also collect position translation data, vertical motion data, and/or rotational data of the product 110 relative to the sensors(s) 104A-N, which can be used (e.g., by the controller 116) to determine a velocity of the product 110. In some implementations, the motion sensor(s) 104A-N can include optical flow sensors (e.g., infrared, IR, optical flow sensors). The motion sensor(s) 104A-N can be attached to one or more regions of the cart 100. For example, the motion sensor(s) 104A-N can be positioned along a top perimeter 108 of the shopping cart 100 to define a top horizontal plane of the cart 100. The motion sensor(s) 104A-N can be arranged in a single line and sufficiently spaced apart (e.g., 5 mm between each sensor) to reliably detect motion data across the top horizontal plane of the cart 100 when the product 110 is added to or removed from the cart 100. The motion sensor(s) 104A-N can also be positioned at one or more other regions of the cart, including but not limited to at corners of the cart 100, near a front end of the cart 100, near the handle 102, and/or along one or both of right and left sides of the cart 100. In some implementations, the cart 100 can include one motion sensor 104A. In some implementations, the motion sensors 104A-N can include one or more sensors that are configured to detect motion of the cart 100. For example, the motion sensors 104A-N can determine when the cart 100 is moving or stationary. As another example, the motion sensors 104A-N can detect an acceleration and/or velocity of the cart 100 as it moves throughout a retail environment. In some implementations, the cart 100 can include any suitable quantity of motion sensors 104A-N.

The sound sensor(s) 106A-N (e.g., microphone devices) can be positioned at one or more suitable locations, including along an inside and/or outside portion (e.g., bottom and/or side) of the shopping cart 100 (e.g., in and/or underneath a basket of the cart 100), along a top perimeter 108 of the shopping cart 100, and/or other suitable locations. The sound sensor(s) 106A-N, for example, can include traditional microphones and/or transducer microphones. Traditional microphones, for example, can be directed toward an interior of the cart's basket, such that sounds from inside the cart are more readily detected and extraneous noise from outside of the cart is reduced. Transducer microphones, for example, can generally detect sounds generated by items coming into contact with the cart. The sound sensor(s) 106A-N can detect immediate changes in sound in the cart 100 as the product 110, and other products, are added to or removed from the cart 100. Audio signals generated by the sound sensor(s) 106A-N, for example, can be provided to an audio buffer that is continually overwritten (e.g., with the most recent audio, such as ten seconds, twenty seconds, sixty seconds, or another suitable length of audio being available from the audio buffer). The cart 100 can have one sound sensor 106A. The cart 100 can also have multiple sound sensors 106A-N. The sound sensor(s) 106A-N can be positioned in one or more locations throughout the shopping cart 100.

In general, the sound sensors 106A-N can be arranged in various configurations on the bottom and/or sides of the shopping cart 100, and/or along the top perimeter 108 of the shopping cart 100. For example, sound sensor configurations 130*a-d* are shown in FIG. 1A, although other sound sensor configurations can be used to arrange sound sensors 106A-N throughout the shopping cart 100. In sound sensor configuration 130*a*, for example, sound sensors can be arranged in a line along a rear portion of the shopping cart 100 (e.g., in proximity to the power source 118). In sound sensor configuration 130*b*, for example, sound sensors can be arranged in a line along a central axis of the shopping cart 100, from a front portion of the cart to a rear portion of the cart. In sound sensor configuration 130*c*, for example, sound sensors can be arranged in a triangular pattern, with a single sound sensor in a central front portion of the shopping cart 100, another sound sensor in a rear left corner of the cart 100, and another sound sensor in a rear right corner of the cart 100. In sound sensor configuration 130*d*, for example, sound sensors can be arranged such that a different sound sensor is located at each corner of the shopping cart 100. In each of sound sensor configurations 130*a-d*, for example, multiple sound sensors (e.g., two sensors, three sensors, four sensors, or another suitable number of sound sensors) can be placed along a floor of the shopping cart's basket (e.g., inside or underneath the basket). Audio data received from each of the multiple sound sensors can be used to identify a location of an item placement in the shopping cart 100 (e.g., using triangulation techniques), which can in turn be used to shift the phase of each of the sound sensors. Audio signals resulting from the shifted phases of the sound sensors, for example, can be provided to train and/or use a machine learning model (e.g., as described in further detail below).

The optional controller 116 can be in communication (e.g., wired, wireless) with the mobile device 112, the motion sensor(s) 104A-N, and the sound sensor(s) 106A-N. The controller 116 can include one or more processors, CPU, RAM, and/or I/O. The controller 116 can perform one or more of the techniques described herein. As described herein, one or more of the techniques can also be performed by the mobile device 112, instead of or in addition to being performed by the controller 116.

The optional power source 118 can provide power to one or more components of the shopping cart 100, including but not limited to the motion sensor(s) 104A-N, the sound sensor(s) 106A-N, and the controller 116. In some implementations, the power source 118 may also provide power to the mobile device 112 (e.g., to charge the device 112) while and/or when the mobile device 112 is mounted at the mounting fixture(s) 114.

The optional indicator(s) 140*a-b* can, for example, can include one or more output devices (e.g., indicator lights, speakers, tactile devices, etc.) on or near the handle 102 of the shopping cart 100 and/or around a top perimeter of the cart 100 (e.g., a ring of upward-facing indicator lights). In general, the indicator(s) 140*a-b* can be configured to convey verification status information that pertains to an addition of an item to the cart 100, and/or an overall state of the cart 100. In some implementations, the indicator(s) 140*a-b* can be configured to provide verification status information to a user of the shopping cart 100 instead of, or in addition to, verification status information provided by the mobile device 112. For example, the indicator(s) 140*a-b* can include a first indicator that indicates a successful item verification (e.g., a green light, a chime tone, etc.), and can include a second indicator that indicates an unsuccessful item verification (e.g., a red light, a buzzer tone, etc.). In some implementations, the indicator(s) 140*a-b* can be configured to provide information that indicates an overall state of the shopping cart 100. For example, the indicator(s) 140*a-b* can include different indicators (e.g., different colored lights, different light intensities, and/or different flashing light patterns) that indicate whether the cart 100 is active, is inactive, is malfunctioning, is waiting for an item to be added, has detected that an item has been added (e.g., either with or without an indication of whether the item has been successfully or unsuccessfully verified), and/or other suitable cart states. As another example, the indicator(s) 140*a-b* can include different indicators for directing a user during a checkout process. For example, the indicator(s) 140*a-b* can include a first indicator (e.g., a green light) that indicates that a transaction is complete and that a customer may leave the store, a second indicator (e.g., a yellow light) that indicates that a user is to proceed to a station where a partial check of the cart contents is performed (e.g., by an employee), and a third indicator (e.g., a red light) that indicates that a user is to proceed to a manual checkout station where the entire cart contents are determined and the transaction is completed. In some implementations, the indicator(s) 140*a-b* can be an LED light bar and/or an LED light strip. One or more other light configurations can be used for the indicator(s) 140*a-b*.

FIG. 1B illustrates an example sound-based validation process as performed by the shopping cart 100 of FIG. 1A. One or more components depicted in FIG. 1B, such as the controller 116, the mobile device 112, the motion sensor(s) 104A-N, the sound sensor(s) 106A-N, and a product information data store 120 can communicate via network(s) 122. The network(s) 122 can provide communication using one or more communication technologies, such as WiFi, Bluetooth, Long Range (LoRa), or another suitable communication technology.

The sound-based validation process can begin when a user (e.g., shopper, guest, customer) scans the product 110 with their mobile device 112 (step A, 150). An application, for example, can be presented at the mobile device 112 and can provide the user with an option to scan products they wish to purchase. When the products are scanned, the products can be added to a virtual shopping cart and a transaction for a current shopping experience can be updated to include the scanned products. The user can therefore complete the transaction (e.g., complete a retail checkout process) at the mobile device 112 instead of having to wait in line to complete a traditional checkout process at a checkout lane or station in the retail environment. Since the user can seamlessly and efficiently complete the transaction at the mobile device 112, the user can simply walk out of the retail environment with the product 110 and other purchased products in the cart 100.

The user can scan a product identifier, such as a barcode, of the product 110 with their mobile device 112. Using the scanned identifier, the mobile device 112 can retrieve product information from the product information data store 120 (step B, 152). In other words, the mobile device 112 can request information for a product that is associated with the scanned product identifier.

The information can include expected audio data for the scanned product. For example, the information can include known audio signatures for the scanned product that demonstrate sound changes over time (e.g., an audio profile, an acoustic fingerprint, etc.) as the scanned product is placed in a shopping cart. The information can also include expected velocity or other motion data for the scanned product. In some implementations, the information may also include product dimensions, product type, price, relevant promotions/offers, etc. The mobile device 112 can transmit the retrieved product information to the controller 116 (step C, 154). Once the user scans the product 110, the user can put the product 110 in the shopping cart 100.

The sound sensor(s) 106A-N can detect sudden (e.g., instantaneous, immediate) sounds that may occur in the cart 100 when the product 110 is put in the cart 100 (step D, 156). The sound sensor(s) 106A-N can transmit audio data signatures to the controller 116 (step E, 158) once the sound(s) are detected in step D (156).

The motion sensor(s) 104A-N can also detect when the product 110 is entering the cart 100 (step F, 160). Step F can be performed before, during, and/or after a sound is detected by the sound sensor(s) 106A-N in step D (156). For example, the motion sensor(s) 104A-N can detect the product 110 passing through the top horizontal plane at the top perimeter 108 of the cart 100 before the sound sensor(s) 106A-N can detect sound(s) inside the cart 100.

The motion sensor(s) 104A-N can, in some implementations, detect when an infrared (IR) beam of light is broken by the product 110 passing through the top horizontal plane at the top perimeter 108 of the cart 100. This can indicate that the product 110 is entering the cart and that motion data should be collected. In some implementations, the motion sensor(s) 104A-N can simply sense/detect movement at the top perimeter 108 of the cart 100 and thus begin collecting motion data (step G, 162). The motion data can be collected until the motion sensor(s) 104A-N no longer detect movement at or near the top perimeter 108 of the cart 100. In some implementations, the motion data can be collected until the motion sensor(s) 104A-N no longer detect that an IR beam of light is broken.

As described herein, the motion data can include positional translation information, rotational data, and/or movement data of the product 110 relative to positions of the motion sensor(s) 104A-N in the cart 100, and/or can include movement data of the cart 100. The collected motion data can be transmitted, by the motion sensor(s) 104A-N, to the controller 116 (step H, 164). In some implementations, the controller 116 can process the motion data to determine a velocity of the product 110 and/or a position over time for the product 110. The motion data can be used by the controller 116 to validate the product 110.

The controller 116 can determine product validation in step I (166). In other words, the controller 116 can determine whether the audio data signature(s) and the motion data match, are similar to, or are sufficiently close to the expected product information for the scanned product. As described further herein, the controller 116 can determine, for example, whether the audio data signature(s) detected by the sound sensor(s) 106A-N are within predetermined threshold ranges of expected audio signatures that are included in the product information for the scanned product. The controller 116 can also apply one or more machine learning trained models to the received motion data and/or audio data signatures in order to correlate the data and validate the product 110. The controller 116 can validate the product if the detected audio data signature(s) and/or the detected motion data are within predetermined ranges and/or clusters of the product information for the scanned product. The controller 116 may not be able to validate the product if the detected audio data signature(s) and/or the detected motion data are not within predetermined ranges and/or clusters of the product information for the scanned product. In some implementations, the controller 116 can also determine a quantity of the product 110 entering the cart 100. For example, if the controller 116 registers two successive and distinct sound signatures (e.g., changes) that are within some threshold of each other (e.g., they are similar), the controller 116 can determine that two of the same product 110 were placed in the cart. In some implementations, one or more aspects of the product validation process can be performed by the mobile device 112, in addition to or instead of the controller 116.

The controller 116 can transmit and output its validation determination at the mobile device 112 (step J, 168). For example, once the product 110 is validated, the mobile device 112 can complete a checkout process (e.g., automatically or based on user input indicating a desire to complete the checkout process). That way, the user may not have to wait in line to complete the checkout process at a checkout station/lane. As another example, once the product 110 is validated, the user can continue scanning other products with their mobile device 112, and the steps A-J can be repeated for each product that the user adds to the cart 100. The user can also be presented with a notification, message, or other form of output at the mobile device 112 indicating that the product 110 is validated.

If the determination is that the product 110 is not validated, a notification, message, or other form of output can be presented at the mobile device 112 indicating that the user should rescan the product 110 or put the correct product in the shopping cart 100. One or more other notifications can also be generated as described throughout this disclosure.

Although not depicted, in some implementations, the product validation determination can be transmitted to and outputted at another computing system, device, and/or data store. For example, the determination can be transmitted to a user device of a retail environment employee who can be tasked with reviewing potential security vulnerabilities and/or suspicious activity in the retail environment. If the controller 116 determines that the product 110 does not match the product identifier that was scanned by the guest, then the controller 116 can transmit a notification to the user device of the retail environment employee indicating that the product 110 is not validated. The retail environment employee may decide to monitor the guest to determine whether the guest is engaging in suspicious activity, such as ticket switching.

In some implementations, steps A-B (150-152) can be performed at a different time and/or during one or more other steps described in FIG. 1B. Sometimes, one or more of the steps can be performed by one device, such as the mobile device 112, or by multiple devices, as depicted in FIG. 1B. In some implementations, one or more of the steps can be performed by a cloud-based system and/or in a cloud-based service.

Figure 2:
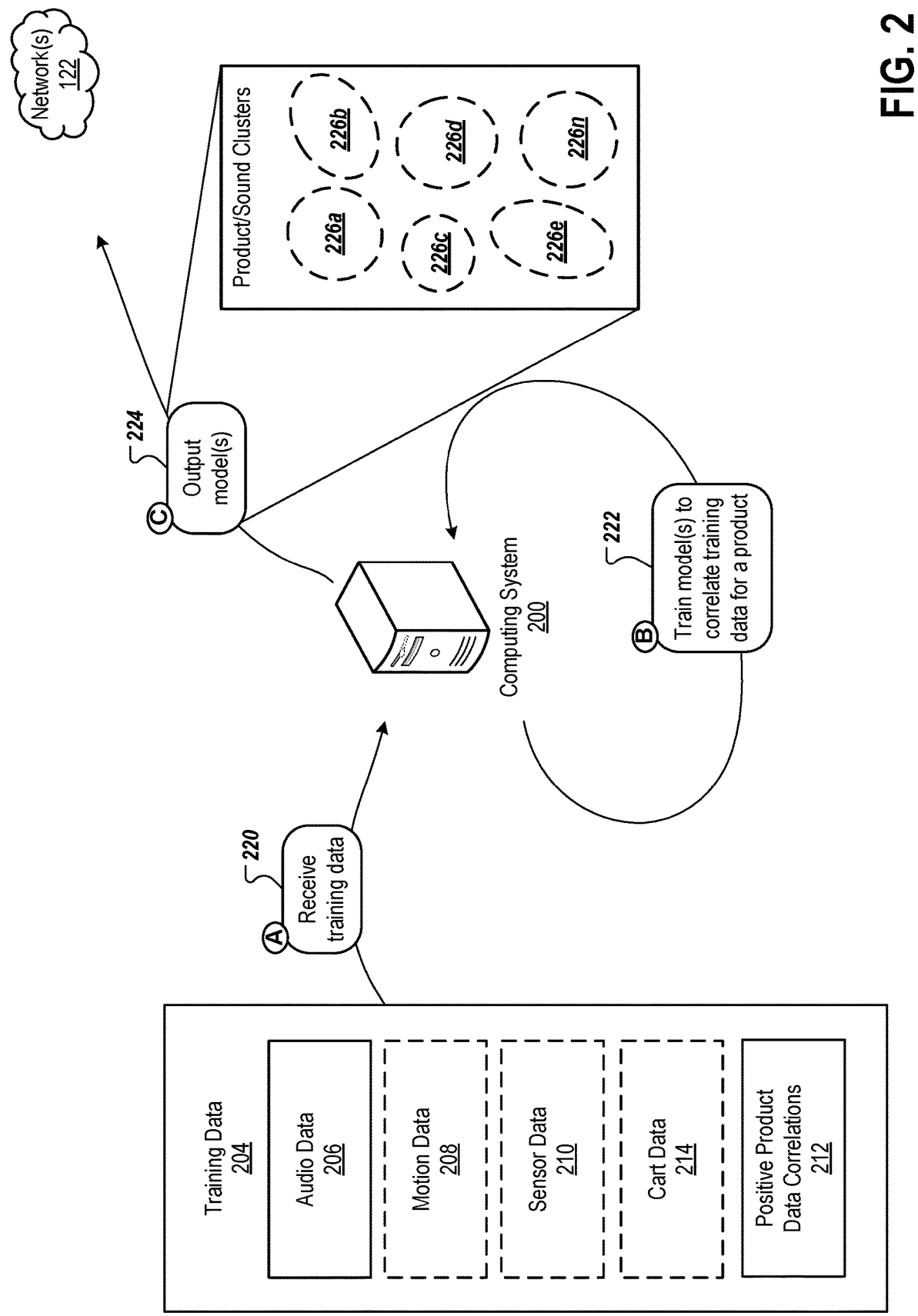
FIG. 2 is a conceptual diagram for training one or more machine learning models that are used to validate products using the disclosed techniques.

FIG. 2 is a conceptual diagram for training one or more machine learning models that are used to validate products using the disclosed techniques. More particularly, the models can be used to correlate different types of data associated with a product. The correlated data can then be compared to expected data for that product to validate the product.

A computing system 200 can train the models using machine learning. The models can be convolutional neural networks (CNNs) or other multi-layered machine learning based approaches. The computing system 200 can be a remote system, a computer system of a retail environment and/or a network of retail environments, a cloud-based system, and/or a cloud-based service. Once the models are trained by the computing system 200, the models can be stored in a data store for later retrieval by the controllers 116 of shopping carts 100 and/or mobile devices 112 of users (e.g., guests) in the retail environment. Once the models are trained, the models can also be transmitted to one or more controllers 116 and/or mobile devices 112 for runtime use with the disclosed techniques.

Although the training in FIG. 2 is described with reference to training a model (e.g., by using machine learning techniques), multiple models can be trained using the same techniques. Referring to the training in FIG. 2, the computing system 200 can receive training data 204 in step A (220). The training data 204 can be retrieved from a data store. The training data 204 can also be received from one or more other computing systems in communication with the computing system 200 via the network(s) 122.

The training data 204 can include audio data 206, optional motion data 208, optional sensor data 210, and positive product data correlations 212. One or more other types of data can be included in the training data 204. The audio data 206 can be collected over time for a variety of products as they are put into shopping carts. The audio data 206 can measure fluctuations or changes (e.g., spikes) in sound in shopping carts when different products are placed, tossed, thrown, or otherwise put into the shopping carts. The motion data 208 can be collected over time for a variety of products as they are put into shopping carts. The motion data 208 can measure different speeds, rotation, movement, and or positioning of the different products as they are placed, tossed, thrown, or otherwise put into the shopping carts. Optionally, the motion data 208 can also include data that indicates movement of the shopping carts when the products are put into the shopping carts. The sensor data 210 can also be collected over time for a variety of products as they are put into shopping carts. The sensor data 210 can include information such as RFID scans, image data, and/or shadow maps of light obstructed by a product as it enters a shopping cart. The cart data 214 can include information such as a sound sensor configuration of a shopping cart (e.g., including a position and/or type of each sound sensor of the cart), a current contents of a shopping cart (e.g., with the cart being an empty cart, a partially full cart including a variety of other products, etc.), and/or other suitable cart data. The positive product data correlations 212 can be actual, verified correlations of different data for the variety of products. In some implementations, the correlations can be represented by data indicating a change in sound over time for a product. As another example, the correlations can be represented by data indicating projected sound changes over some timeframe for the product.

The computing system 200 can train a model to correlate the training data 204 for a product (or a class of products) in step B (222). In general, a product class can include a group of different products that have substantially similar sound profiles (e.g., the products produce substantially similar audio signatures when placed in a cart). A store might offer various different goods (e.g., compact discs, video game discs, DVDs, etc.) that each produce a similar audio signature when placed in a cart, for example, and can thus be represented by a same sound cluster (e.g., one of clusters 226a-n). For example, for each product (or product class), the computing system 200 can map the audio data 206, motion data 208, and other sensor data 210 into n-dimensional (e.g., 2D, 3D, 4D, etc.) space. The computing system 200 can identify clusters 226a-n of the mapped data and determine n-dimensional space values for each of the clusters. The clusters 226a-n each represent different data that can be correlated for the corresponding product (or class of products) and thus used to demonstrate, at a particular time, information about the product or product class (e.g., a sound produced when the product, or a product that belongs to the product class, is being thrown into a shopping cart at 2 m/s). The clusters can represent projected sound changes over time for the product (or product class), which, during runtime, can be compared to expected sound changes over time for the product (or product class) to validate the product. By grouping a large number of products that produce similar sounds into a smaller number of product classes, for example, a model size (and/or a number of models) used for validating products can be reduced. In implementations in which products are grouped into product classes, for example, a relatively small number of clusters (e.g., 20, 50, 100, or another suitable number) can be used to represent a large number of individual products (e.g., 10,000 or more).

Training the model (step B, 222) can include inputting the training data 204 into the model and comparing output from the model to the positive product data correlations 212. Accuracy of the model can be determined based on this comparison and the model can be continuously trained and improved to refine its accuracy. In some implementations, when training a model, audio data (e.g., audio data 206) and motion data (e.g., motion data 208) and/or other sensor data (e.g., sensor data 210) can be used together. For example, a same product may produce a variety of different sounds when placed in a cart, depending on how it is placed (e.g., a gently placed product may produce a different sound than a dropped product or a thrown product). As another example, a same product may produce a different sound when placed in a cart, depending on whether the cart is moving when the product is placed in the cart. In some implementations, when training a model, audio data (e.g., audio data 206) and cart data (e.g., cart data 214) can be used together. For example, a same product may produce a variety of different sounds when placed in a cart, depending on current contents of a cart (e.g., a product placed in an empty cart may produce a different sound than a product placed in a cart that already includes clothes, or a cart that already includes boxed goods). When building an initial model, for example, various different techniques can be used for placing products in carts (e.g., gently placing a product in a cart, dropping the product in the cart, throwing the product in the cart, placing the product in a stationary cart, placing the product in a moving cart, etc.), and/or various different arrangements of other products may be present in a cart (e.g., the cart may be empty, the cart may be partially full of soft goods, the cart may be partially full of hard goods, etc.). In some implementations, audio data (and optionally, other data) received from a shopping cart during a user's shopping trip can be used for training the model. For example, data from multiple different shopping trips by multiple different users can be added to a training set used to train the model, to account for a wide variety of different product placement techniques and cart contents.

Once the model is trained (and accuracy of the model is within a predetermined range or threshold level), the model can be outputted (step C, 224). Outputting the model can include storing the model in a data store for future retrieval and runtime use. Outputting the model can also include transmitting the model to one or more controllers 116 of shopping carts 100 and/or mobile devices 112 for local storage and fast deployment during runtime use.

Figure 3:
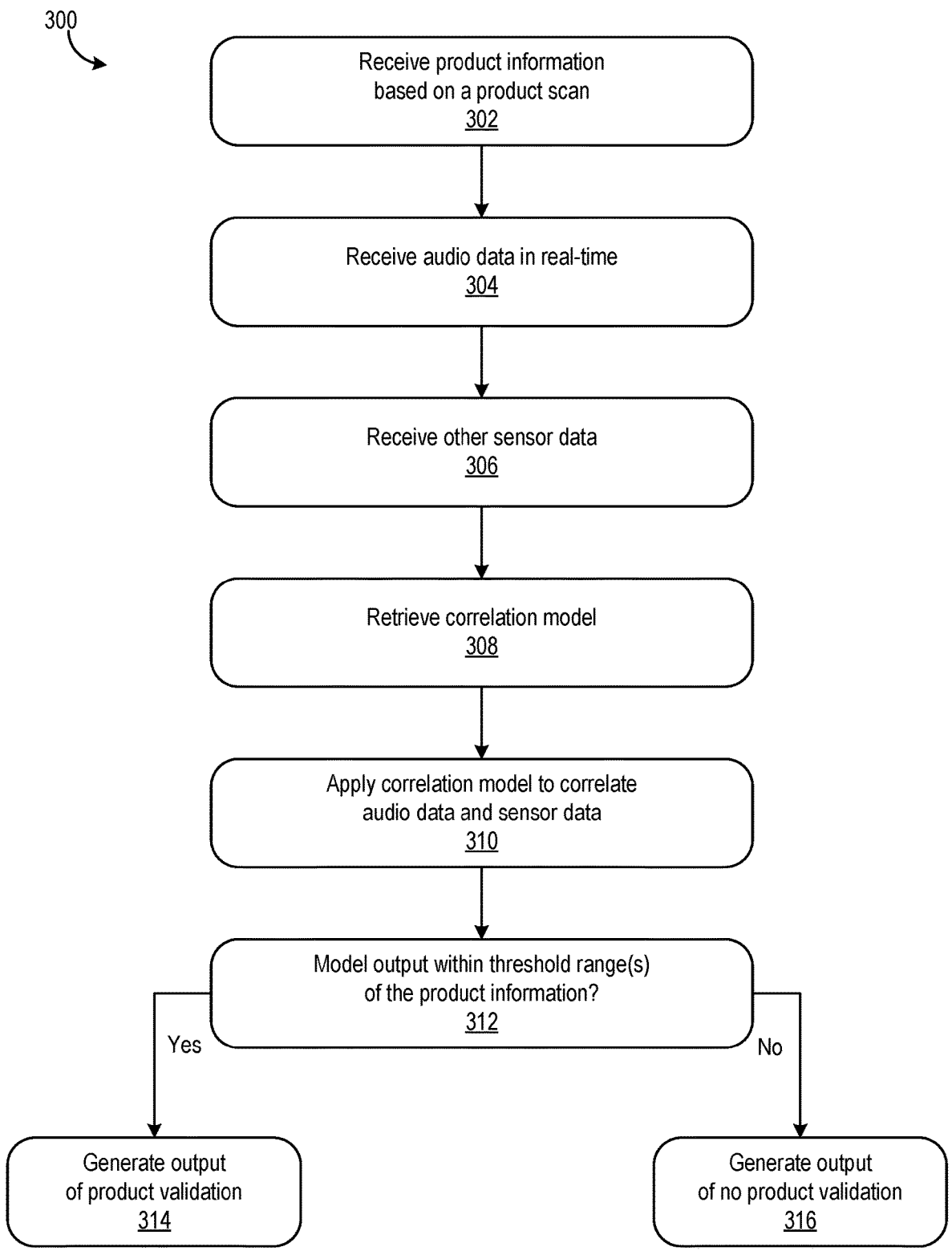
FIG. 3 is a flowchart of a process for using a machine learning model to validate a product.

FIG. 3 is a flowchart of a process 300 for using a machine learning model to validate a product. As described herein, the model can be used to correlate, in real-time, different data signals received of a product being added to a shopping cart. In some implementations, the model can also be trained to compare the correlated data to expected data for the product. The process 300 can be used to validate the product in real-time or near real-time, thereby providing a user with a quick and efficient checkout process with their mobile device.

The process 300 can be performed by the controller 116 of the shopping cart 100 (e.g., as shown in FIGS. 1A-B). One or more operations of the process 300 can be performed by the mobile device 112 of the user, in addition to or instead of the controller 116. Performing the process 300, or one or more operations of the process 300, at the mobile device 112 can beneficially leverage efficient processing power and low power consumption of the mobile device 112. Thus, validation determinations can be made quickly, accurately, and efficiently in real-time or near real-time. In some implementations, one or more operations of the process 300 can be performed by another computing system, device, network of computers, cloud-based system, and/or cloud-based service. For illustrative purposes, the process 300 is described from the perspective of a controller.

Referring to the process 300 shown in FIG. 3, the controller can receive product information based on a product scan (302). As described throughout this disclosure, the product can be scanned by a user at a mobile device. The user can scan the product's barcode or other unique identifier. The mobile device can then use the identifier to retrieve, from a data store, product information associated with the scanned product. The mobile device can then transmit that product information to the controller. In some implementations, the mobile device can transmit the unique identifier for the scanned product to the controller. The controller can then retrieve, from the data store, the product information associated with the scanned product using the unique identifier. In some implementations, where the mobile device performs the product validation process, the mobile device may not transfer the unique identifier or the product information to the controller. Instead, the mobile device can maintain the unique identifier and the product information in local, temporary storage for quick access and retrieval.

The received product information can include information associated with one or more expected audio signatures of the product (e.g., representing expected sound changes over time). The audio signatures can represent an expected sound produced in a cart when the product is put into the cart at a particular speed/velocity. As described with reference to FIGS. 5A-C, for example, the speed/velocity associated with an expected sound change over time can be used to adjust (e.g., scale) audio data associated with the product that is received in real-time. Adjusting the real-time audio data can facilitate comparison of the real-time audio data to the expected audio data for the product, to determine whether the product put in the cart matches the scanned product. In some implementations, the received product information can include a product class identifier for a scanned product. For example, multiple different products that have similar sound profiles can be grouped into a common product class. The product class identifier, for example, can be an enumerated value that distinguishes a product class from other product classes. One or more other types of product information can be received (at 302), including but not limited to shape and volume data.

The controller can receive audio data in real-time (304). In some implementations, the controller can continuously poll sound sensor(s) of the cart at predetermined time intervals for sound changes in the cart. In some implementations, once a product is scanned by the mobile device and the controller receives notification of the scan (such as receiving the product information at 302), the controller can poll the sound sensor(s) for changes in sound in the cart. In some implementations, the sound sensor(s) can detect sounds in the cart and automatically transmit those sounds in real-time to the controller, without a request or poll from the controller.

As described throughout, the sound data can include signatures of sound values detected in real-time in the cart. Sound in the cart can fluctuate over a period of time when a product is added to the cart and until the product settles down in the cart. For example, when a milk carton is put in the cart, the detected sound can fluctuate, from a relatively loud initial sound spike (e.g., a thump), to a subsequent sloshing sound. As another example, when a box of macaroni is placed in the cart, the sound can fluctuate, from a relatively quiet initial sound spike, to a subsequent rattling sound. Further, a speed at which the product is put into the cart can also impact the sounds that are detected in real-time. If the milk carton is thrown into the cart, for example, the audio data may demonstrate a louder initial sound spike, and a longer time period of sloshing, whereas if the milk carton is slowly placed inside the cart, the audio data may demonstrate a quieter initial sound spike, and a shorter time period of sloshing. Thus, a combination of acoustic data and motion data can be beneficial for determining whether the product being added to the cart is the same product that was scanned.

The controller can also receive other sensor data (306). Similar to receiving the audio data, the controller can poll other sensors of the cart, such as motion sensors and/or optical flow sensors, for detected data, and/or the other sensors can automatically transmit detected data to the controller. The other sensor data can include position translation data of the product relative to the other sensors as the product is moving into the cart, rotational data, motion data, shadow maps, other light signals, RFID signals, etc. Optionally, the controller can receive data that indicates a configuration of sound sensors affixed to a cart and/or a current contents of the cart (e.g., based on a virtual shopping cart that corresponds to the cart).

Operations 302-306 can be performed in any order. For example, the controller can receive the other sensor data (306) at the same time as receiving the audio data (304). The controller can also receive the other sensor data (306) before receiving the audio data (304) and/or before receiving the product information (302). One or more other orders of the operations 302-306 is also possible. Any of the operations 302-306 can be performed before, during, or after each other.

The controller can also retrieve a correlation model (308). The correlation model can be stored in a data store. In some implementations, after the model is trained, it can be deployed to the controller and stored in local storage (e.g., RAM) of the controller for quick retrieval and use during the process 300. For example, the model can be a relatively static model that is periodically updated (e.g., during retraining), and deployed to a respective controller of each shopping cart when the update is complete. Each type of cart in a store, for example, can be associated with a different correlation model that has been trained using a sensor configuration that is specific to the type of cart. In some implementations, the model can be deployed to the user's mobile device. For example, when the user begins a shopping trip, and the user's mobile device is paired with a cart selected by the user, the correlation model that corresponds to the user's selected cart can be deployed to the user's mobile device. The correlation model can be trained by a computing system as described with reference to FIG. 2. As described in FIG. 2, the model can be trained to correlate different, seemingly disparate types of data for a particular product. In some implementations, the controller can retrieve multiple correlation models to use in the process 300.

The controller can then apply the correlation model to correlate the audio data and the sensor data (310). Correlating the audio data and the sensor data can include matching spikes (e.g., fluctuations) in detected sound with changes in position over time of the product as it is added to the cart. As a result, the correlated data can indicate when sound changes occur based on a speed at which the product enters the cart. In some implementations, as described further with reference to FIGS. 5A-C, correlating the data can include adjusting (e.g., scaling) the audio data and/or the other sensor data to a same scale as the expected audio data or other product information. In some implementations, applying the correlation model can include providing the audio data and sensor data (and optionally, cart data) to the model, and receiving output from the model that indicates whether the provided data matches expected data for the scanned product (or matches expected data for a product class to which the scanned product belongs). For example, the correlation model can produce output that indicates a degree of confidence for each product (or product class) on which the model has been trained.

Figure 5A:
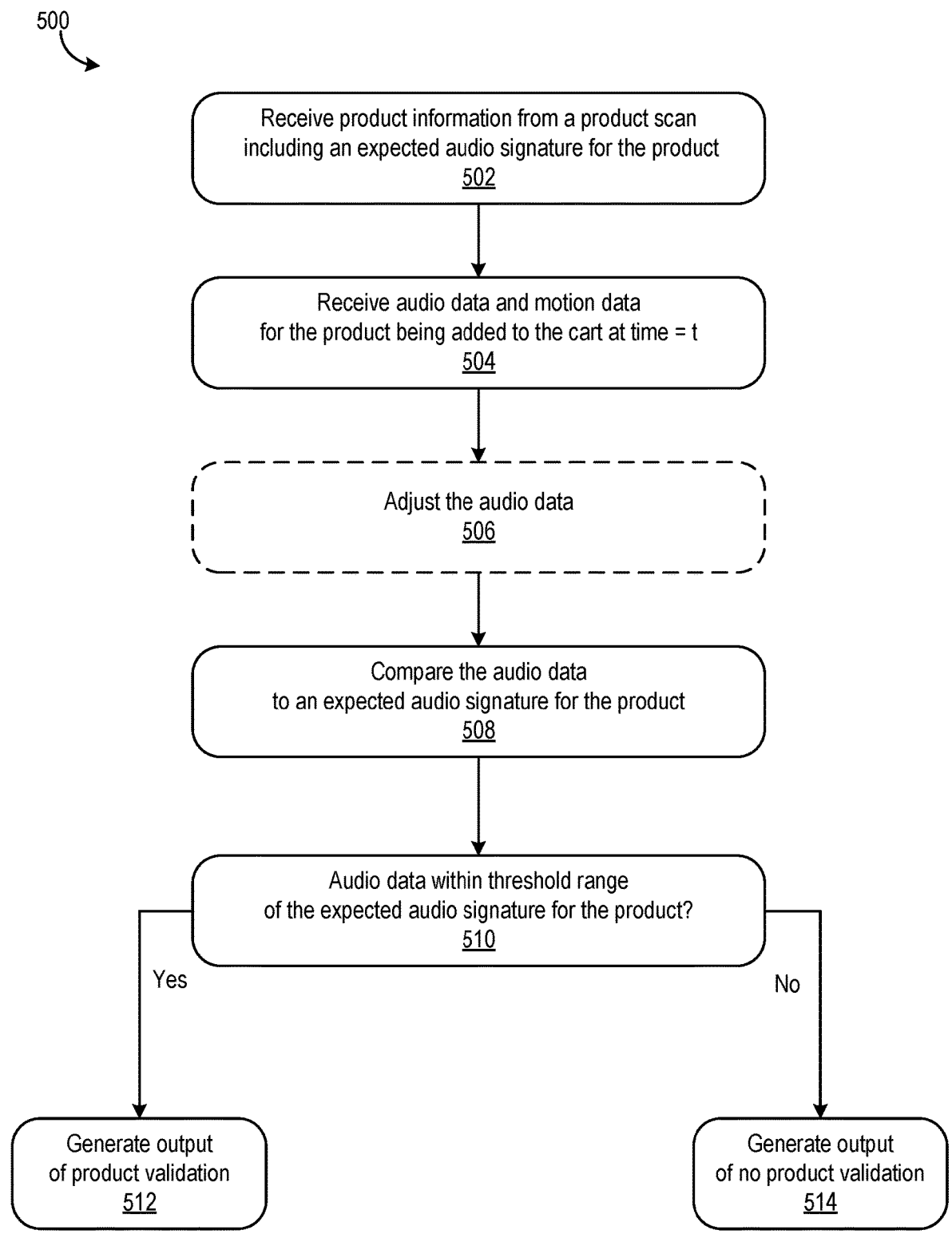
FIG. 5A is a flowchart of a process for validating a product based on analysis of changes in the product's acoustic signatures over time.
Figure 5B:
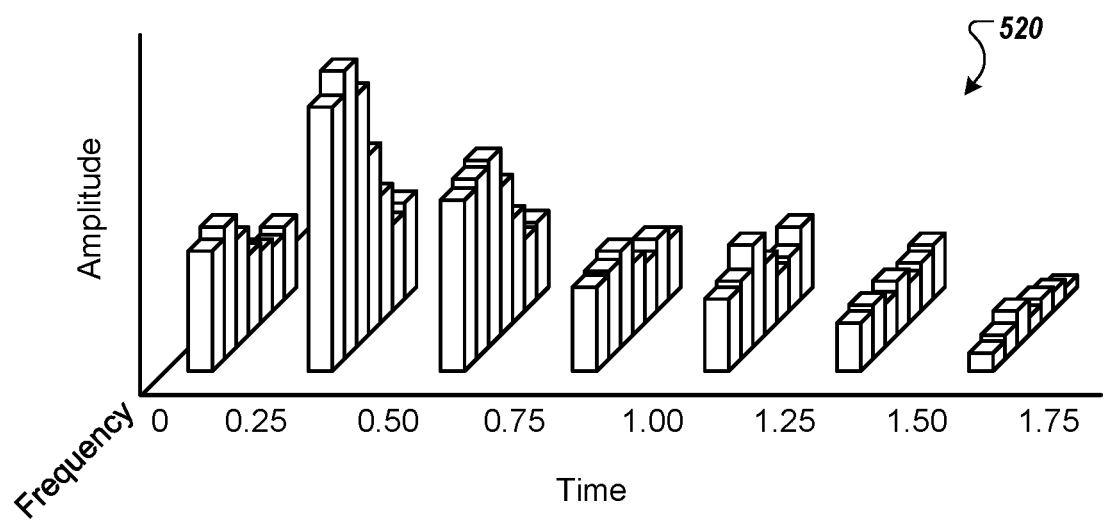
FIG. 5B depicts measured audio signatures for products over time.
Figure 5B:
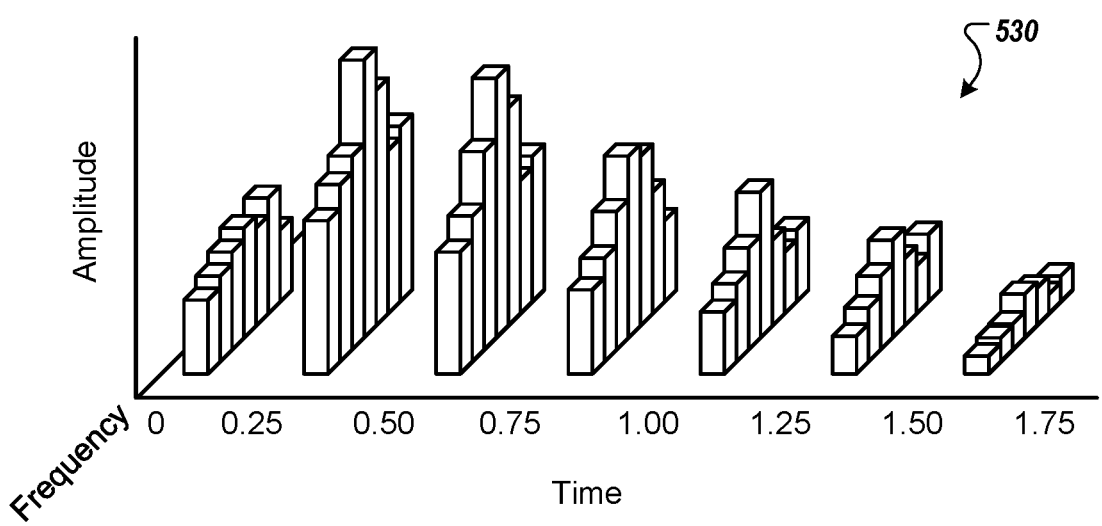
Figure 5C:
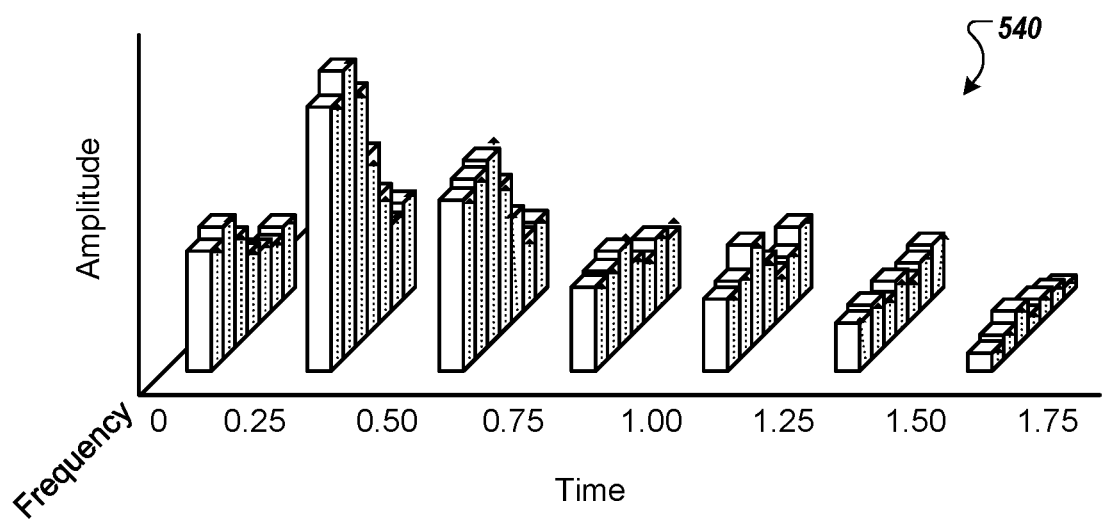
FIG. 5C depicts comparisons of the measured audio signatures with expected audio signatures for the products.
Figure 5C:
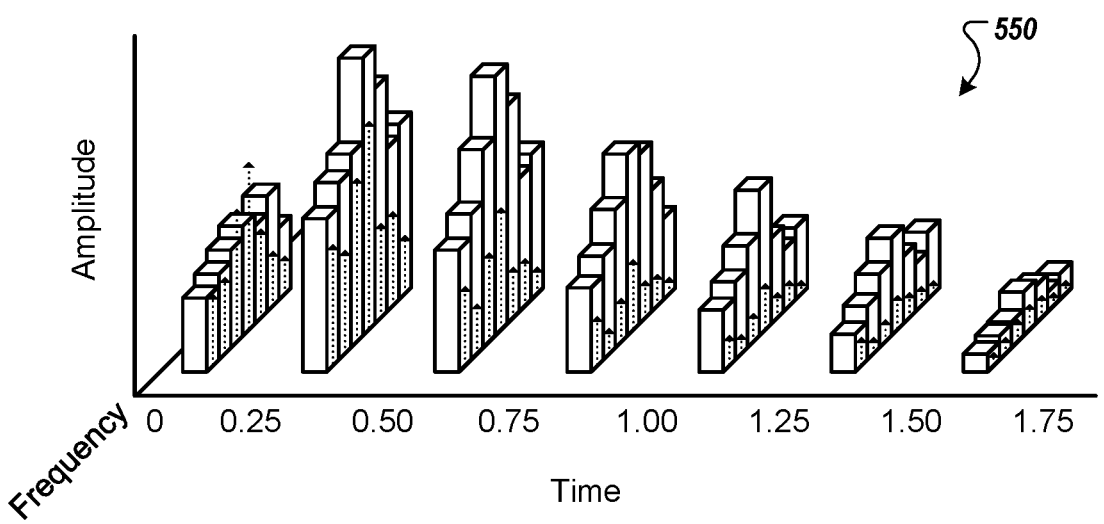

The controller can determine whether the model output is within a predetermined threshold range of the product information (312). For example, the controller can compare the correlated data (e.g., a sound change over time, based on speed of the product as the product enters the cart) to the expected audio data for the product. If the correlated data deviates from the expected audio data by more than a predetermined threshold amount, then the controller can determine that the product cannot be validated. If, on the other hand, the correlated data deviates from the expected audio data by less than the predetermined threshold amount or otherwise is similar or the same, then the controller can determine that the product in the cart matches the scanned product. In some implementations, determining whether the model output is within the predetermined threshold range of the product information can include determining whether a degree of confidence in the model output indicates that a scanned product matches the product placed in the cart. For example, the degree of confidence can be over a threshold degree of confidence (e.g., over 80%, 90%, 95%, or another suitable value), and/or the degree of confidence for the scanned product (or product class) can be greater than confidence values for other products (or product classes) on which the model has been trained. Refer to FIGS. 5A-C for further discussion.

Accordingly, if the model output is within the predetermined threshold range of the product information (and a number of detected sound spikes matches an expected product quantity), the controller can generate output indicating product validation (314). The output can include a notification, message, or other form of output to be presented to the user at the mobile device. The output can indicate that the product in the cart matches the scanned product. The output can also prompt the user to continue scanning products and/or to select an option to complete a transaction at the mobile device. In some implementations, the controller may not generate output. Instead, the controller can transmit a notification to the mobile device indicating that the product is validated, which can cause the mobile device to complete a transaction at the mobile device or let the user continue to scan products with the mobile device. One or more other outputs are also possible.

If, on the other hand, the model output is not within the predetermined threshold range of the product information (and/or an incorrect quantity of the product was detected), the controller can generate output indicating that the product is not validated (316). For example, a number of sound spikes may not match an expected product quantity (e.g., a quantity indicated by a user). The output can include a notification, message, or other form of output to be presented to the user at the mobile device. The output can indicate that the product in the cart does not match the scanned product. The output can prompt the user to remove the product from the cart, put the actual scanned product in the cart, and/or scan the product that was originally put in the cart. In some implementations, the output can prevent the user from scanning additional products until the user corrects their mistake.

In some implementations, as described herein, the output can be provided to a computing device of another relevant user, such as retail environment employees. The retail environment employees can review the output and monitor the user. The retail environment employees may intervene and review the contents of the user's cart before the user exits the retail environment. Thus, the retail environment employee can use the output to more accurately and quickly identify product shortages in the retail environment. By doing so, the retail environment employee can readily address the product shortages such that the product shortages do not have a negative impact on shopping experiences of other customers and/or sales for the retail environment.

Figure 4:
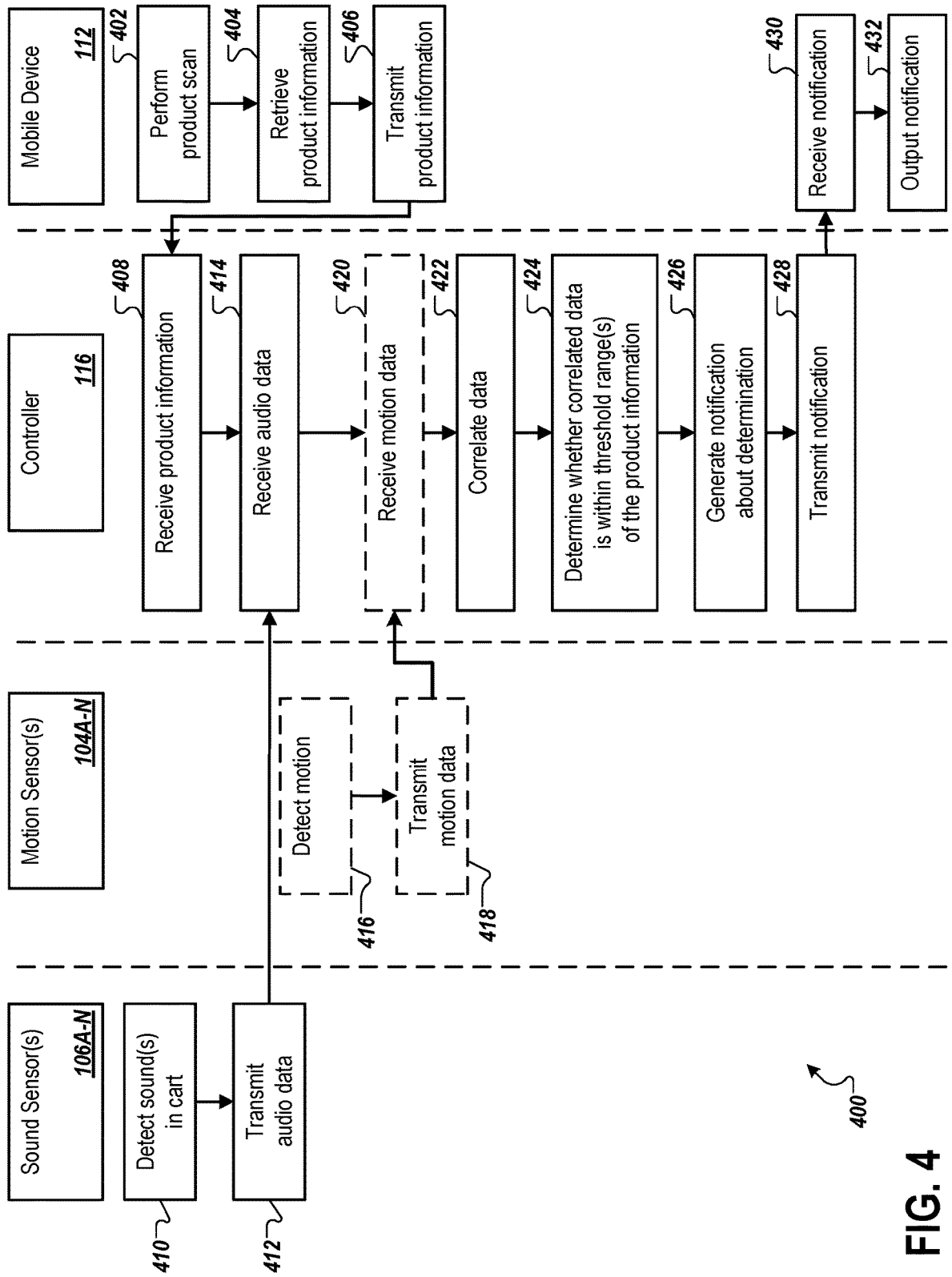
FIG. 4 is a swimlane diagram of a process for validating a product using the disclosed techniques.

FIG. 4 is a swimlane diagram of a process 400 for validating a product using the disclosed techniques. Although operations in the process 400 are shown as being performed by one or more particular components, it is also possible that one or more of the operations are performed by other components. For example, the mobile device 112 can perform product validation (e.g., 424) instead of the controller 116. As another example, correlating data, performing product validation, and/or generating a notification (e.g., 422-426) can be performed by another computing system, device, remote computer, cloud-based system, and/or cloud based service. Moreover, one or more of the operations in the process 400 can be performed in one or more different orders. For example, performing a product scan (e.g., 402-406) can be performed at a same time as (optionally) detecting product and/or cart motion (e.g., 416-418) and/or detecting sound in the cart (e.g., 410-412). As another example, performing the product scan (e.g., 402-406) can optionally trigger or cause detection of product and/or cart motion (e.g., 416-418), and can then trigger or cause detection of sound in the cart (e.g., 410-412). The operations of the process 400 can also be performed in one or more other orders.

Referring to the process 400 shown in FIG. 4, a product scan can be performed at the mobile device 112 (402). Scanning the product at the mobile device can include taking a picture or capturing other image data of the product using an image sensor of the mobile device. The image data can depict a portion of the product having a unique identifier, such as a barcode, SKU, UPC, etc. The mobile device 112 can retrieve product information using the unique identifier that was captured in the product scan (404). In some implementations, the controller 116 can retrieve the product information instead of the mobile device 112. The mobile device 112 can transmit the product information to the controller 116 (406), which the controller 116 receives (408). Refer to FIGS. 1A-B and FIG. 3 for further discussion.

The sound sensor(s) 106A-N can detect sound(s) in the shopping cart (410). The sound sensor(s) 106A-N can transmit audio data to the controller 116 (412), which receives the audio data (414). As described herein, operations 410, 412, and/or 414 can be performed before, during, or after operations 402-408. The audio data can be transmitted as it is detected by the sound sensor(s) 106A-N in real-time. In some implementations, the audio data can be transmitted in batches in near real-time. In some implementations, the audio data can be transmitted once a sound spike (e.g., a sound having an intensity over a threshold baseline value) is detected and then for a predetermined period of time (e.g., additional sound spikes are not detected for 1 second, 2 seconds, 3 seconds, or another suitable period of time).

The motion sensor(s) 104A-N can detect product and/or cart motion data (416). The motion sensor(s) 104A-N can transmit the product and/or cart motion data to the controller 116 (418), and the controller 116 can receive the product and/or cart motion data (420). Similar to the operations 410-414, the operations 416-420 can be performed before, during, or after any of operations 402-414. For example, product and/or cart motion can be detected (416) after a product scan (402) but before detecting sound(s) in the cart (410). Detected product motion, for example, can indicate that a product is expected to be placed in the cart, and that detection of a corresponding sound is expected to occur. In general, a length of an audio sample for validating a product can be in the range of one to two seconds, and can vary based on the product. For example, an audio sample for validating a relatively solid product (e.g., a banana) can be longer than an audio sample for validating a relatively loose product (e.g., a box of pasta). As another example, product motion can be detected (416) at a same time as sound(s) are detected in the cart (410), but before the product information is transmitted to the controller 116 (406). One or more other variations are also possible. Detected cart motion, for example, can indicate whether the cart is moving or stationary when an item has been placed in a cart (e.g., when the item enters a top horizontal plane of the cart). In some implementations, the cart motion data can include a binary value that indicates whether the cart is moving. In some implementations, the cart motion data can include a speed of the cart.

The product and/or cart motion data can be transmitted as it is detected by the motion sensor(s) 104A-N in real-time. In some implementations, the motion data can be transmitted in batches in near real-time. In some implementations, the motion data can be transmitted once motion is no longer detected through a top horizontal plane of the cart.

Once the controller 116 receives the product information, audio data, and motion data, the controller 116 can correlate the data (422). As described herein (e.g., refer to FIGS. 2-3), the controller 116 can apply one or more machine learning trained models to correlate the received information/data. In some implementations, a series of rolling windows can be used for processing the received information/data by the one or more machine learning trained models. For example, a model can determine a window size (e.g., a length of an audio sample) for validating a particular product, during the training process. When processing the received information/data, for example, the model can process the information/data according to the window size (e.g., one second, two seconds, or another suitable window size), for each of the series of rolling windows, overlapping by a fixed amount of time (e.g., one tenth of a second, two tenths of a second, or another suitable amount of time). When a peak match is found for a product (e.g., a confidence value for the product placed in the cart is a highest value for matching the scanned product (or product class) or another product (or another product class)), the product can be validated or not validated.

The controller 116 can determine whether the correlated data is within threshold range(s) of the product information (424). If the correlated data is within the threshold range(s) of the product information (e.g., if the peak match for the product placed in the cart is the scanned product, or is of a product class to which the scanned product belongs), the controller 116 can validate the product. (In other words, the product put in the cart is likely the same as the product that was scanned by the mobile device 112.) Conversely, if the correlated data is not within the threshold range(s) of the product information (e.g., if the peak match for the product placed in the cart is not the scanned product, or is of a product class to which the scanned product does not belong), the controller 116 may not validate the product. (In other words, the product put in the cart likely is not the same as the product that was scanned by the mobile device 112.)

In some implementations, operations 422 and/or 424 can be performed by one or more other components, such as the mobile device 112. Performing the operations 422 and/or 424 at the mobile device 112 can beneficially leverage processing power and available computing resources at the mobile device 112. As a result, product validation determinations can be made quickly and efficiently at the mobile device 112.

The controller 116 can then generate a notification about the determination (426). As described herein, the notification can be a message or other form of output presented to the user of the mobile device 112. The notification can indicate that the product is validated (e.g., based on the controller 116 determining (424) that the correlated data is within the threshold range(s) of the product information). The notification may also indicate that the product is not validated and that the user may take some action to address the problem, such as removing the product put in the cart and replacing it with the actual scanned product or scanning the product put in the cart. One or more other notifications are possible, as described throughout this disclosure.

The controller 116 can transmit the notification (428), which the mobile device 112 can receive (430). In some implementations, the controller 116 can transmit the notification or other notifications to other computing devices and/or systems, including but not limited to computing devices of retail environment employees.

The mobile device 112 can output the notification (432). The user can therefore be presented the notification. In some implementations, instead of or in addition to outputting the notification, the mobile device 112 can also perform some action in response to receiving the notification (430). In other words, the notification can include instructions that, when executed by the mobile device 112, cause the mobile device 112 to perform one or more actions. For example, the instructions can cause the mobile device 112 to update transaction information to reflect a price and quantity of the validated product. In other words, the validated product can be added to the user's transaction (e.g., in a virtual shopping cart) so that the user can purchase that product. As another example, the instructions can cause the mobile device 112 to remove the scanned product information from the transaction if the product is not validated. As another example, the instructions can cause the mobile device 112 to complete the transaction by receiving payment information from the user or otherwise processing payment information that the user saved in the application presented at the mobile device 112.

FIG. 5A is a flowchart of a process 500 for validating a product based on analysis of changes in the product's audio signatures over time. Sound measurements can be collected instantaneously as the product is put in a shopping cart, and analyzed to identify potential sound spikes (e.g., a change in sound intensity over a threshold baseline value) or other sudden sound changes. The changes in sound can be clustered and may identify different patterns, such as the product hitting an interior side of the cart, contents of the product (e.g., macaroni in a box of macaroni) moving around even after the product is already stationary on a bottom surface of the cart, etc. Each of the clusters can be compared to expected audio signatures and/or other information (e.g., movement, velocity) about a product that was scanned to determine whether the product added to the cart matches the scanned product (e.g., the expected product). Thus, the process 500 can be used to analyze clusters of audio data over time to determine product matching (e.g., validation) and/or multiple quantities of the product.

The process 500 can be performed by the controller 116 of the shopping cart 100 (e.g., refer to FIGS. 1A-B). One or more operations of the process 500 can be performed by the mobile device 112 of the user, in addition to or instead of the controller 116. Performing the process 500 (or one or more operations of the process 500) at the mobile device 112 can beneficially leverage efficient processing power and low power consumption of the mobile device 112. Thus, validation determinations can be made quickly, accurately, and efficiently in real-time or near real-time. In some implementations, one or more operations of the process 500 can be performed by another computing system, device, network of computers, cloud-based system, and/or cloud-based service. For illustrative purposes, the process 500 is described from the perspective of a controller.

Referring to the process 500 shown in FIG. 5A, the controller can receive product information from a product scan (502). The product information can include one or more expected audio signatures for the product that was scanned. The expected audio signature can be predetermined for the product and stored in a data store. The expected audio signature can, for example, be derived from prior instances of the product being added to a shopping cart. For example, audio signatures can be collected for the product as the product is added to a shopping cart or different shopping carts at different velocities, positions, rotations, quantities, etc. These audio signatures can represent an expected change in sound over time. (Refer to the processes 300 and 400 shown in FIGS. 3-4 for additional discussion about audio signatures.) In some implementations, the expected audio signature can be extrapolated based on adjusting (e.g., scaling) a known sound of the product being placed in a cart using one or more different velocities or other motion/movement data (e.g., data that represents product motion and/or cart motion). In some implementations, multiple expected audio signatures can be provided for a product, each expected audio signature corresponding to a different velocity range at which the product may be placed in the cart. For example, a first expected audio signature can correspond to the product being dropped in the cart at a relatively high velocity, a second expected audio signature can correspond to the product being placed in the cart at an average velocity, a third expected audio signature can correspond to the product being gently placed in the cart at a relatively low velocity, etc. In some implementations, multiple expected audio signatures can be provided for a product, each expected audio signature corresponding to a different quantity range of products in the cart when the product is being added. For example, a first expected audio signature can correspond to the product being placed in a substantially empty cart, a second expected audio signature can correspond to the product being placed in a partly full cart, a third expected audio signature can correspond to the product being placed in a substantially full cart, etc.

The controller can receive at least one audio signature for the product being added to the cart at time=t (504). For example, the controller can receive audio data as it is detected in real-time. As a result, the process 500 can be performed in near real-time. At the same time or near the same time as performing operation 504, the controller may receive motion data. The motion data can indicate a velocity at which the product enters the cart and/or a velocity of the cart when the product enters the cart. The motion data can also include position translation data that can be used, by the controller and using trigonometric functions, to determine a velocity of the product as it enters the cart.

The controller can optional adjust (e.g., scale) the audio data (506). For example, the audio data can be correlated with the product motion data to determine a velocity at which a product was placed in the cart and how the sound detected in the cart changed over time. This correlated data can be represented in a spectrogram, and acoustic fingerprint, or another representation of sound attributes (e.g., frequencies and/or amplitude) as the sound attributes vary over time. However, the audio data collected in real-time may be correlated with a different velocity than the expected audio signature for the scanned product. Thus, the audio data collected in real-time (e.g., the spectrogram) can be adjusted (e.g., scaled) such that it can be examined on a same scale as the expected audio signature for the scanned product. The scaling can be based on the velocity at which the expected audio signature is determined. In some implementations, the audio data collected in real-time can be adjusted based on cart motion data. For example, if the cart motion data indicates that the cart had been moving when the product entered the cart, noise reduction can be performed on the audio data to remove sounds that may be caused by movement of the cart. The amount of noise reduction, for example, can be adjusted in proportion to the velocity of the cart.

The controller can compare the audio data (which has optionally been adjusted) to the expected audio signature for the product (508). For example, the controller can generate a spectrogram based on the audio data that plots frequency and amplitude of the audio vs. time. As another example, the controller can generate an acoustic fingerprint of the audio data, by converting high dimensional raw audio to a smaller dimensional image (e.g., by sampling the audio and applying a Fourier transformation to the audio data). Features of the spectrogram and/or acoustic fingerprint of the audio data can be compared to corresponding features of the expected audio signature (e.g., another spectrogram and/or acoustic fingerprint), for example. The controller can compare the audio data and the expected audio signature, based on analyzing the data over a particular period of time, such as between t=0 seconds and t=1 seconds. As a result, the controller may not have to wait until more audio data is collected and available to make a real-time determination of whether the product is validated. In some implementations, the controller can apply one or more machine learning models to compare the audio data (which has optionally been adjusted) to the expected audio signature for the scanned product. In some implementations, in addition to or instead of adjusting the measured audio data that corresponds to the product being placed in the cart, a suitable expected audio signature can be selected from multiple different expected audio signatures that correspond to the product. For example, a velocity at which the product was placed in the cart can be determined (e.g., based on the motion data), and an expected audio signature that corresponds to the determined velocity can be selected from the multiple different expected audio signatures, and can be used for comparing the audio data. As another example, a quantity of products currently in the cart can be determined (e.g., based on a shopper's virtual shopping cart), and an expected audio signature that corresponds to a range of products similar to the current quantity of products can be selected from the multiple different expected audio signatures, and can be used for comparing the audio data.

The controller can determine whether the adjusted audio signature is within a threshold range of the expected audio signature for the product (510). As described with reference to FIGS. 3-4, the controller can determine how closely the detected sound over time aligns with the expected audio signature for the scanned product. The greater the deviation from the expected audio signature, the more likely the product added to the cart does not match the scanned product. The less deviation from the expected audio signature (e.g., deviation that is less than the threshold range), the more likely the product added to the cart matches the scanned product.

Accordingly, if the audio data (which has optionally been adjusted) is within the threshold range of the expected audio signature, the controller can generate output indicating product validation (512). If, on the other hand, the audio data is not within the threshold range, the controller can generate output indicating that the product was not validated (514). Refer to FIGS. 3-4 for additional discussion on the output.

FIG. 5B depicts examples of measured audio signatures for products that are added to a shopping cart. The graphical depictions represent audio signatures 520, 530 (e.g., spectrograms, acoustic fingerprints, or another suitable type of audio signature) for two different products. Each of the audio signatures 520, 530, for example, can represent a spectrum of frequency values of an audio signal generated by a respective product being placed in the shopping cart, as the frequency values vary in amplitude over time (e.g., 1 second, 2 seconds, 3 seconds, or another suitable period of time). In the present example, time is plotted along the x-axis, amplitude is plotted along the y-axis, and frequency is plotted along the z-axis. In some implementations, an audio signature may be represented by a compact data structure (e.g., an acoustic fingerprint), in which a sound is sampled at a predetermined rate (with a predetermined number of samples per second), across a predetermined number of frequency bins. At each time interval and for each frequency bin, for example, an amplitude of an audio signal at the time interval and for the frequency bin can be measured, and can be maintained in the data structure. In some implementations, as described with reference to FIG. 5A, a product can be added to a cart, and the collected audio data can therefore be associated with the product. In general, the audio signatures 520, 530, may not be detected/received at the same time. For example, when sound is detected in the cart, the controller may only receive the detected audio signature for a most recent product that was scanned by the user at the user's mobile device.

As shown in the graphical depictions representing audio signatures 520, 530, the signatures for different products can vary depending on physical properties of the products, and on the velocities at which they enter or entered the cart. For example, the amplitude of a sound signal produced by a product generally spikes up when the product first enters the cart, then decays over time, then eventually levels out to a baseline level (e.g., once contents of the product have stopped moving). In general, the higher the velocity and/or force at which the product enters the cart, the greater the initial amplitude and the longer the decay. Further, different products may be associated with different frequency spectrums and different decays, based on physical properties of the products. In the present example, a first product (e.g., a milk carton) associated with audio signature 520 can exhibit an initial sound spike across relatively low frequencies (e.g., due to its relatively large size), and a relatively short decay (e.g., due to the contents of the product coming to rest quickly). On the other hand, a second product (e.g., a macaroni box) associated with audio signature 530 can exhibit an initial sound spike across relatively high frequencies (e.g., due to its relatively small size), and a relatively long decay (e.g., due to the contents of the product rattling for a period of time).

Since the audio signatures 520, 530 can vary depending on the velocity at which the products enter the cart, each of the signatures can be adjusted (e.g., scaled, and/or normalized) linearly and/or algorithmically. The signatures can be adjusted to be more easily compared with expected audio signatures, for example. In some implementations, scaling the signatures can include taking a predetermined multiplier (e.g., 0.5×, 2×, 10×, etc.) that is associated with a given velocity, and multiplying the amplitude of the signatures at each frequency by the multiplier. For example, expected audio signatures can be associated with a baseline velocity. When a velocity of a product entering the cart is less than the baseline velocity, for example, a multiplier that is less than one can be applied, whereas when the velocity of the product entering the cart is greater than the baseline velocity, a multiplier that is greater than one can be applied. In some implementations, scaling the signatures can include multiplying the amplitudes at each frequency by a factor that is proportional to the detected/determined velocity at which the products enter the cart. Thus, the signatures can be adjusted to match a velocity used to generate the expected audio signatures for a given product. As a result of adjusting the signatures, the detected sound changes can be more accurately compared to the expected sound changes of the scanned product.

FIG. 5C illustrates graphical representations 540 and 550 of comparisons between measured acoustic signatures and expected acoustic signatures for products. The representation 540, for example, depicts the detected sound changes over time (e.g., the audio signature 520, shown in FIG. 5B) for a first product (e.g., a milk carton that produced the audio signature 520 when placed in the cart) against the expected sound signature for the scanned first product (e.g., as represented by the vertical dotted lines representing expected amplitude across frequencies over time). The representation 550, for example, depicts the detected sound changes over time (e.g., the audio signature 530, shown in FIG. 5B) for a second product (e.g., a macaroni box that produced the audio signature 530 when placed in the cart) against the expected sound signature for the scanned second product (e.g., as represented by the vertical dotted lines representing expected amplitude across frequencies over time). Once the detected sounds for the products are (optionally) adjusted and normalized according to the velocity associated with the expected audio signatures for the scanned products in the representations 540, 550, it can be determined (e.g., by the controller 116 and/or the mobile device 112) whether the detected sounds match their respective expected audio signatures, and whether the products are validated. The disclosed techniques can provide for instantaneous product validation rather than waiting for the sounds of the detected product to completely decay or level out (e.g., at 2 seconds in the graph representations 540, 550). Instead, product validation can be performed using a portion of the detected audio data, such as sounds that are detected between t=0 and t=1 second. Sounds detected between t=0 and t=1 can be compared to the expected audio signature for the scanned product between t=0 and t=1, for example.

Determining whether a measured audio signature matches an expected audio signature, for example, can include determining whether a threshold number and/or a threshold percentage of measured amplitudes are within a threshold range of expected amplitudes, across frequencies over time. In the example representation 540, the measured audio signature between t=0 and t=1 for the first product (e.g., the milk carton) closely matches the expected audio signature between t=0 and t=1 for the first product. In the present example, for each sampling time interval and for each frequency bin, the measured amplitude is within a threshold range of the expected amplitude, and accordingly, the first product can be validated as matching the scanned product.

In the example representation 550, however, the measured audio signature between t=0 and t=1 for the second product does not closely match the expected audio signature between t=0 and t=1 for the scanned product. In the present example, the measured amplitude is not within a threshold range of the expected amplitude for a number of frequency bins in the sampling intervals between t=0 and t=1 (e.g., fewer than 95% of the bins, 90% of the bins, 80% of the bins, or another suitable value), and accordingly, the second product may not be validated as matching the scanned product.

Figure 6:
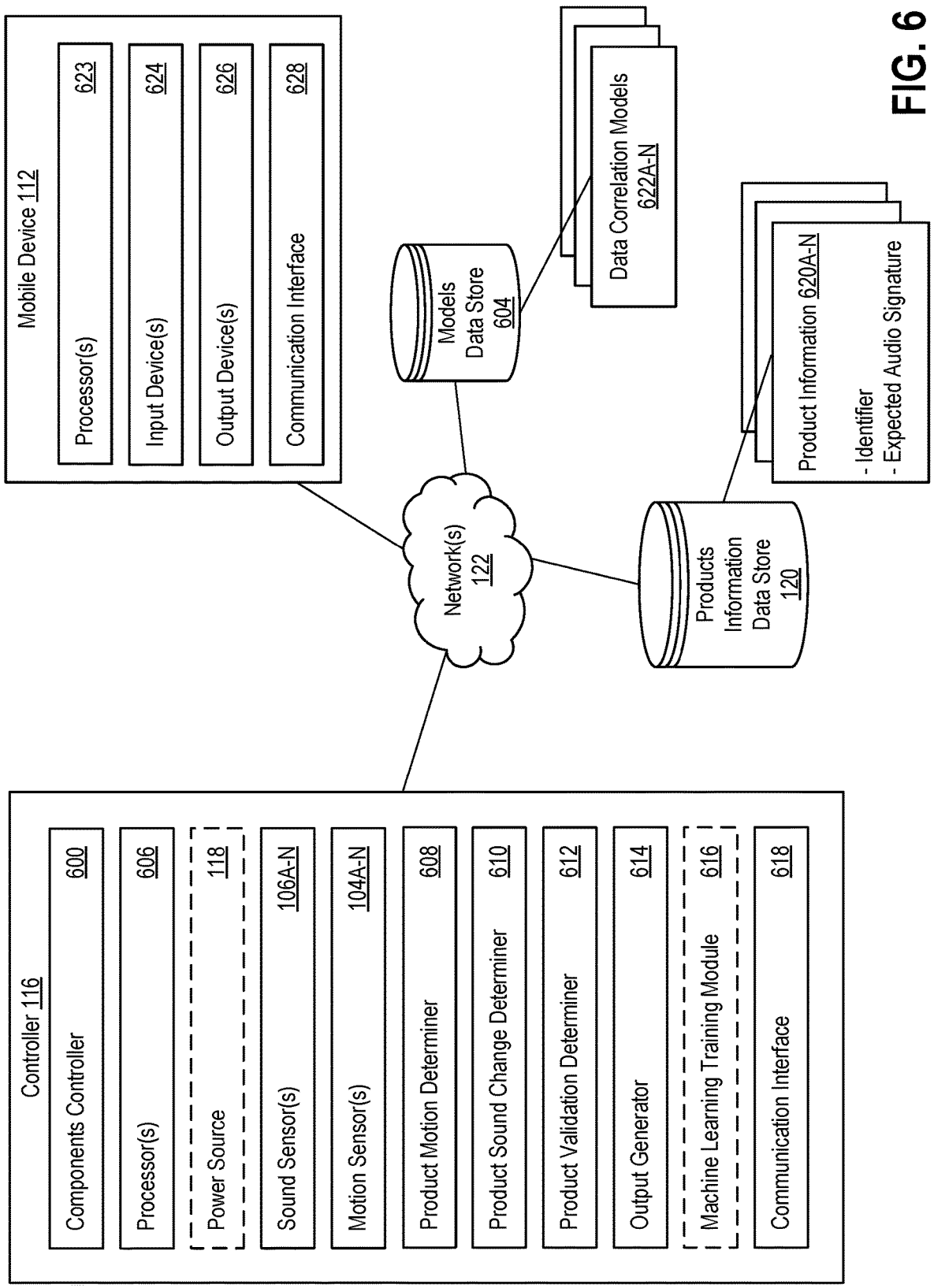
FIG. 6 is a system diagram depicting components that can be used to perform the techniques described herein.

FIG. 6 is a system diagram depicting components that can be used to perform the techniques described herein. As described herein, the controller 116, mobile device 112, products information data store 120, and a models data store 604 can communicate (e.g., wirelessly, wired, Bluetooth, LAN, etc.) via the network(s) 122. In some implementations, one or more of the components described herein can be integrated or otherwise part of a same system, network, computer, and/or device.

The mobile device 112 can be configured to provide a graphical user interface (GUI) application for users to use and improve their shopping experiences in a retail environment. The mobile device 112 can include processor(s) 623, input device(s) 624, output device(s) 626, and a communication interface 628. The processor(s) 623 can be configured to execute instructions that cause the mobile device 112 to perform one or more of the functions, processes, and/or techniques described herein. For example, the instructions can cause the mobile device 112 to perform the functions of a product validation determiner 612 of the controller 116. Performing such functions at the mobile device 112 can beneficially leverage efficient and light processing power and compute resources at the mobile device 112.

The input device(s) 624 can include any types of input devices, including but not limited to touchscreen displays, screens, keyboards, mice, cameras, other image sensors, and/or microphones. The input device(s) 624 can receive input from the user of the mobile device 112. The user can provide input such as scanning a product with a camera of the mobile device 112. The mobile device 112, via the processor(s) 623, can process the image from the scan to identify a unique identifier of the product. The unique identifier can then be used to retrieve corresponding product information 620A-N from the products information data store 120. In some implementations, the mobile device 112 can retrieve the product information 620A-N from the data store 120. In some implementations, the mobile device 112 can transmit the unique identifier to the controller 116 (e.g., the product validation determiner 612), which can then retrieve the product information 620A-N from the data store 120.

The product information 620A-N can include the identifier associated with the scanned product and an expected audio signature for the scanned product. The product information 620A-N can also include additional information about the scanned product, including but not limited to supplier/vendor information, price, discounts, promotional offers, physical dimensions, weight, and/or other information about the scanned product. The user can also provide other input to the mobile device 112 using the input device(s) 624 including but not limited to selection of promotions, discounts, and/or quantities of a product the user wishes to purchase. The user input can also include selecting an option to perform a checkout process and complete a current transaction at the mobile device 112. Other types of input are also possible.

The output device(s) 626 can present information to the user in a GUI application. The output device(s) 626 can include touchscreen displays, other display screens, speakers, etc. The presented information can include selectable options to view products added to a current transaction (e.g., products in a virtual shopping cart), products that have been scanned, recommended products that the user can add to the transaction, promotions, offers, or other discounts to apply to the transaction, and/or a product search interface. One or more other information can be presented to the user via the output device(s) 626 of the mobile device 112.

The communication interface 628 can provide communication between components of the mobile device 112 and one or more other components described herein.

The controller 116 can perform one or more of the functions, processes, and techniques described herein. In some implementations, one or more other components, such as the mobile device 112 can perform one or more functions, processes, and/or techniques of the controller 116. As described throughout this disclosure, each shopping cart in a retail environment can include the controller 116. In some implementations, some shopping carts may include the controller 116 and other shopping carts may not include the controller 116. Shopping carts that do not include the controller 116 can be in communication with the mobile device 112 and/or remote computing systems, networks, cloud-based systems, cloud-based services, and/or other devices.

The controller 116 can include a components controller 600, processor(s) 606, optional power source 118, sound sensor(s) 106A-N, motion sensor(s) 104A-N, product motion determiner 608, product sound change determiner 610, product validation determiner 612, output generator 614, optional machine learning training module 616, and communication interface 618.

The components controller 600 can control hardware of the shopping cart. For example, the components controller 600 can activate one or more of the sound sensors 106A-N and/or the motion sensors 104A-N of the cart. In implementations where the cart includes additional sensors, such as RFID readers and/or lights, the components controller 600 can control one or more of the additional sensors to activate and/or detect/collect data. In some implementations, the components controller 600 can poll the sound sensors 106A-N and/or the motion sensors 104A-N for recently detected sound and/or motion signals or changes in sound and/or motion signals. The components controller 600 can also poll the additional sensors in the cart for detected signals.

The processor(s) 606 can be configured to perform one or more of the operations, techniques, and/or processes described herein. The processor(s) 606 can receive instructions, that when executed, cause one or more particular components of the controller 116 to perform the operations, techniques, and/or processes described herein.

The power source 118, as described in relation to FIG. 1A, can be optional. For example, the power source 118 can be part of the shopping cart and may supply power to components of the cart, including but not limited to the controller 116, the components controller 600, the sound sensors 106A-N, the motion sensors 104A-N, and/or any additional sensors. In some implementations, one or more of the components described herein can include their own power sources. The power source 118 can be a battery (e.g., rechargeable). One or more other types of power sources 118 can also be used.

The sound sensor(s) 106A-N, as described with reference to FIG. 1A, can be integrated into or otherwise attached to a basket of the shopping cart. In some implementations, the cart may have one sound sensor 106A positioned in the interior of the basket. In some implementations, the cart may have multiple sound sensors 106A-N spread out (e.g., in a grid layout) across the interior bottom of and/or along the interior sides of the basket. The sound sensor(s) 106A-N can be configured to detect real-time changes in sound in the cart when products are added to the cart. The sound sensor(s) 106A-N can automatically transmit, in real-time, detected audio data to components such as the product sound change determiner 610 (e.g., as the audio data changes are detected). The sound sensor(s) 106A-N may also transmit the audio data at predetermined time intervals and/or upon being polled by the components controller 600.

In some implementations, the sound sensor(s) 106A-N may not be triggered (e.g., by the components controller 600 or automatically) to detect sound changes until a product is scanned at the mobile device 112. Thus, the mobile device 112 can transmit a notification to the controller 116 indicating that a product scan was performed. One or more components of the controller 116 can then be activated.

The motion sensor(s) 104A-N, as described with reference to FIG. 1A, can be integrated into the basket of the shopping cart. One or more motion sensor(s) 104A-N can be positioned at predetermined distances around a top perimeter of the basket of the cart and/or other suitable locations. As a result, the motion sensor(s) 104A-N can detect movement near a top horizontal plane of the shopping cart, which can indicate a product as it initially enters the cart. One or more motion sensor(s) 104A-N can also be positioned along sides of the basket (e.g., interior sides of the basket) that can also detect motion of the product once it is entering the cart. The motion sensor(s) 104A-N can detect real-time changes in position, motion, movement, and/or rotation of products as they are added to (or removed from) the cart, and/or can detect real-time changes in position, motion, and/or movement of the cart itself. The motion sensor(s) 104A-N can automatically transmit, in real-time, detected motion data to components such as the product motion determiner 608 (e.g., as the motion data is detected). The motion sensor(s) 104A-N may also transmit the motion data at predetermined time intervals and/or upon being polled by the components controller 600.

Like the sound sensor(s) 106A-N, in some implementations, the motion sensor(s) 104A-N may not be triggered (e.g., by the components controller 600 or automatically) to detect motion data until the product is scanned at the mobile device 112. Thus, the mobile device 112 can transmit a notification to the controller 116 indicating that a product scan was performed. One or more components of the controller 116 can then be activated. Moreover, the motion sensor(s) 104A-N can be activated before the sound sensor(s) 106A-N. For example, the motion sensor(s) 104A-N positioned at the top perimeter of the cart may detect movement at the top horizontal plane of the cart before any sound change can be detected deeper inside the basket of the cart. Therefore, in some implementations, the sound sensor(s) 106A-N may not be triggered (e.g., by the components controller 600 or automatically) until motion is detected by the motion sensor(s) 104A-N.

The product motion determiner 608 can be configured to determine a velocity of the product that is added to the cart. The determiner 608 can receive motion data from the motion sensor(s) 104A-N. The determiner 608 can use trigonometric functions to translate the motion data (e.g., position translation data, rotation data, movement data, etc.) into the velocity of the product.

The product sound change determiner 610 can be configured to determine a sound change over time for the product that is added to the cart. The determiner 610 can receive the audio data from the sound sensor(s) 106A-N. The determiner 610 can also receive the determined velocity for the product from the product motion determiner 608. The product sound change determiner 610 can then correlate the received data to determine how the sound changes over a period of time for the particular product. The determiner 610 can, for example, generate a data representation (e.g., a spectrogram, an acoustic fingerprint, or another suitable representation) for the product that depicts sound change over time for the product. In some implementations, the determiner 610 can retrieve one or more data correlation models 622A-N from the models data store 604. The determiner 610 can apply the retrieved models 622A-N to correlate the acoustic data with the motion data.

The product validation determiner 612 can be configured to determine whether the sound change over time for the product added to the cart matches or is similar to an expected acoustic signature for a product that is scanned by the mobile device 112. The product validation determiner 612 can receive the sound change over time for the product from the product sound change determiner 610. The determiner 612 can also receive the product information 620A-N for the product that is scanned by the mobile device 112. For example, the mobile device 112 can retrieve the product information 620A-N from the data store 120 using the unique identifier of the product from the scan. As another example, the mobile device 112 can transmit the unique identifier to the product validation determiner 612 and the determiner 612 can retrieve the expected acoustic signature in the product information 620A-N for the scanned product.

As described throughout this disclosure, the product validation determiner 612 can compare the sound change over time for the product added to the cart to the expected acoustic signature for the scanned product. The determiner 612 can identify how much the sound change of the added product deviates from the expected acoustic signature for the scanned product. The determiner 612 can determine whether this deviation is within one or more predetermined threshold ranges. If the deviation is within the predetermined threshold ranges, the determiner 612 can validate the product. In other words, the product added to the cart likely matches the product that was scanned by the mobile device 112. If, on the other hand, the deviation is not within the predetermined threshold ranges, the determiner 612 may not validate the product—the product added to the cart likely does not match the product that was scanned by the mobile device 122. As described herein, determinations made by the product validation determiner 612 can also be performed locally by the processor(s) 623 of the mobile device 112.

The output generator 614 can receive the validation determination from the product validation determiner 612. The output generator 614 can generate output to be presented to at least the user at the mobile device 112 based on the validation determination. The output generator 614 can also generate output to be presented to at least one other relevant user at a computing device, such as a retail environment employee. Refer to FIG. 1B, and FIGS. 3-5A for additional discussion about the output generator 614.

The machine learning training module 616 can be optional. The module 616 can be configured to train the data correlation models 622A-N and store the models 622A-N in the models data store 604. Refer to FIG. 2 for additional discussion about training the models 622A-N. In some implementations, the controller 116 may not include the machine learning training module 616. Instead, the module 616 can be part of another device, computing system, network, cloud-based system, and/or cloud-based service. For example, the module 616 can be part of a retail environment computing system. The module 616 can also be part of a cloud-based service that is deployed and used in a network of retail environments. As a result, training can be remote from the other components described herein and/or operation of such components.

Finally, the communication interface 618 can provide for communication amongst the components of the controller 116 and one or more other components described in FIG. 6.

Figure 7:
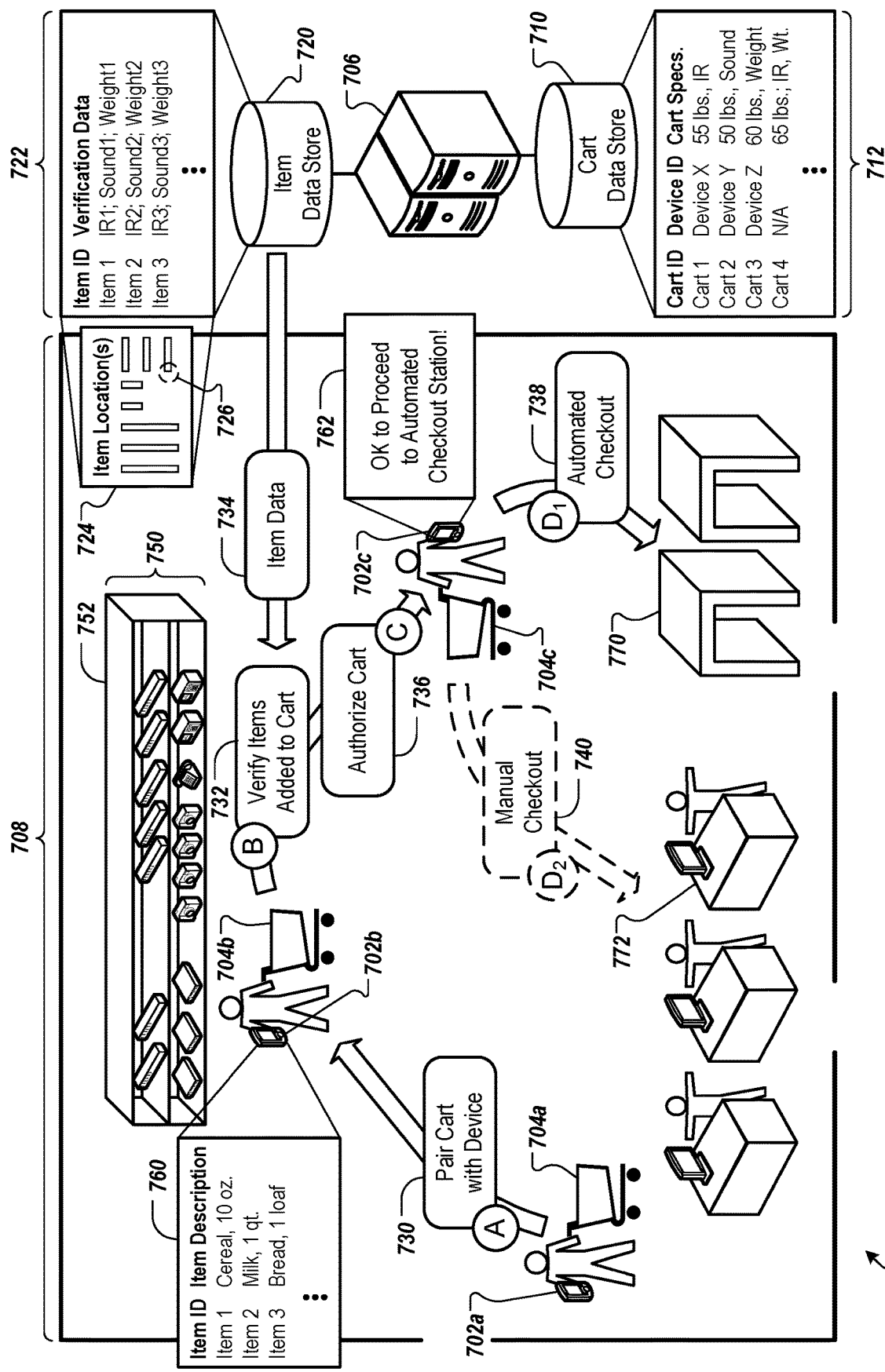
FIG. 7 is a conceptual drawing of an example retail environment, and an example system for verifying items placed in physical shopping carts.

FIG. 7 is a conceptual drawing of an example shopping environment 708, and an example system 700 for verifying items placed in physical shopping carts, as represented in example stages (A) to (D). Stages (A) to (D), for example, may occur in the illustrated sequence, a different sequence, and/or two or more stages (A) to (D) may be concurrent. In some examples, one or more stages (A) to (D) may be repeated multiple times during a shopping trip.

The shopping environment 708 can be a physical retail store, warehouse, or another sort of facility in which various items 750 (e.g., physical products) are stored in various storage units 752 (e.g., shelves, racks, bins, etc.) and are available for selection by various system users (e.g., customers, employees, or other system users). In general, each system user can employ a respective personal mobile device and a respective shopping cart while traversing the shopping environment 708 and adding items to their cart. In the present example, a system user employs mobile device 702 (e.g., a smart phone, a digital assistant, a tablet, or another sort of mobile computing device) and shopping cart 704 (e.g., a smart cart, a dolly cart, a shopping basket, or another sort of manually operated or self-guided physical device for conveying items, that includes various computing components and physical sensors) while shopping. The mobile device 702, for example, can communicate with the shopping cart 704 and with a server system 706 during the user's shopping trip. The server system 706, for example, can include and/or communicate with one or more computing servers (e.g., application servers, cloud servers, data servers, etc.). Communication between the various devices and systems may occur over a communication network and/or may occur over a direct connection.

During stage (A), a shopping cart is paired with a user's mobile computing device. For example, the system 700 can perform operation 730, pairing shopping cart 704 (shown here as cart 704a) with mobile device 702 (shown here as device 702a). Pairing the cart 704 with the mobile device 702, for example, can be initiated when the device 702 detects an identifier of the cart 704, which can be performed by the device 702 in a variety of ways. For example, the user of the mobile device 702 can select an option to scan a cart identifier (e.g., a barcode, a QR code, etc.) on the cart 704, using a mobile application running on the device 702, and can then capture an image of the cart identifier (e.g., using a device camera). As another example, the user of the mobile device 702 can select an option to wirelessly obtain the cart identifier, using the mobile application, and can then follow instructions presented by the mobile application regarding how to position the device 702 relative to the cart 704 to obtain the cart identifier wirelessly. In some implementations, wirelessly obtaining a cart identifier by a mobile computing device can include establishing a local wireless network between the device (e.g., mobile device 702) and a cart (e.g., cart 704). The local network, for example, can be any of a variety of communication networks between the mobile device 702 and the shopping cart 704, such as a WiFi Direct connection, a BLUETOOTH pairing (e.g., BLE pairing), an NFC connection, and/or connections to a common local wireless network (e.g., both the mobile device 702 and the cart 704 being connected to the same WiFi network). Other options for obtaining the cart identifier by the mobile device 702 are also possible. For example, the cart identifier can be obtained by establishing a wired connection between the mobile device 702 and the cart 704 (e.g., a tethered connection, such as a wired USB connection).

Once the cart identifier has been obtained, the mobile device 702 can transmit a cart association request to the server system 706 (e.g., through a WiFi network, or another suitable network of the retail environment 708). The cart association request, for example, can include the obtained cart identifier of the shopping cart 704, and can include information that uniquely identifies the mobile device 702. In response to receiving the cart association request, for example, the server system 706 can update cart data 712 in a cart data store 710 (e.g., a data server, a file system, or another suitable type of data storage device or system) to include data that associates the shopping cart 704 with the mobile device 702. In the present example, the cart data store 710 can include additional shopping cart specifications, such as a weight of a cart, and types of item verification sensors that may exist on the cart (e.g., infrared (IR) sensors, sound sensors, weight sensors, cameras, or other suitable sensors). Such additional information can be used by the system 700 to facilitate verification of items being added to the shopping carts and/or a final verification of cart contents.

During stage (B), items added to a shopping cart are verified. For example, the system 700 can perform operation 732, in which operations of the mobile device 702 (shown here as device 702b), the shopping cart 704 (shown here as cart 704b), and the server system 706 are coordinated to verify one or more items 750 as the items are added to the cart 704. A user can select one or more of the items 750 from its storage unit 752, for example, and can scan the item(s) with the mobile device 702, using a mobile application (e.g., a shopping application) running on the device 702. Item scanning, for example, can be performed by capturing an image of an identifier of a selected item (e.g., a barcode, a QR code, etc.) using a camera of the mobile device 704, by scanning a Radio Frequency Identification (RFID) tag of the selected item using an RFID scanner of the mobile device 704, or by performing another sort of item scan.

Once the item identifier has been obtained (and optionally, once an item quantity has been specified by the user), the mobile device 702 can transmit an item data request to the server system 706 (e.g., through a WiFi network, or another suitable network of the retail environment 708). The item data request, for example, can include the obtained item identifier of a selected item 750. In response to receiving the item data request, for example, the server system 706 can access an item data store 720 (e.g., a data server, a file system, or another suitable type of data storage device or system) that can include, in association with unique identifiers for various types of items (e.g., products in the retail environment 708), item data 722 for the items. The item data 722, for example, can include various types of item verification data for each item, each type of item verification data corresponding to a different type of item verification sensor that may exist on a shopping cart (e.g., infrared (IR) sensors, sound sensors, weight sensors, cameras, or other suitable sensors). In addition to the item verification data, for example, the item data 722 can include other item data in association with an item identifier, such as an item price, an item description, an item weight, an image of the item, one or more known locations of the item in the retail environment 708 according to a planogram and/or a heat map, etc. In the present example, the server system retrieves and provides item data 734 (e.g., including some or all of the item verification data and other item data that pertains to the selected item 750) to the mobile device 702 and/or the shopping cart 704, from the item data store 720.

In some implementations, retrieving and providing item verification data can be based at least in part on shopping cart specifications of a shopping cart that is paired with a mobile device that requested the data. For example, the item data request can include, along with the obtained item identifier of the selected item 750, an identifier of the shopping cart 704 that is paired with the mobile device 702, and/or an identifier of the device 702. Upon receiving the identifier of the shopping cart 704 and/or the identifier of the device 702, for example, the server system 706 can access the cart data store 710 and retrieve (and optionally, cache for later use) shopping cart specifications that correspond to the shopping cart 704. As another option, the mobile device 702 can provide the server system 706 with the shopping cart specifications that correspond to the paired shopping cart 704 as part of the item data request. After receiving the shopping cart specifications for the shopping cart 704 (e.g., including data that indicates each type of sensor that exists on the cart), for example, the server system 706 can retrieve and provide item verification data that corresponds to the selected item 750 and to the types of item verification sensors that exist on the cart 704. By retrieving and providing verification data that pertains to a particular cart, for example, an amount of data transmitted over the network(s) can be reduced, along with data transmission times.

In some implementations, retrieving and providing item verification data (and optionally, other item data) for an item can be performed without the item having been scanned. For example, the mobile device 702 can be associated with a user account that has a historical purchase history maintained by the server system 706. When the mobile device 702 and the shopping cart 704 are paired, for example, the server system 706 can retrieve and provide item verification data (and optionally, other item data) that pertains to a subset of the items 750 that have been frequently purchased by the user, based on the historical purchase history associated with the user's account. As another example, as the mobile device 702 moves throughout the retail environment 708, device location information (e.g., based on wireless signal strength data, Global Positioning System (GPS) data, or other suitable data) can be provided to the server system 706. In response to receiving the device location information, for example, the server system 706 can retrieve and provide item verification data (and optionally, other information) that pertains to a subset of the items 750 that are in proximity to the mobile device 702 (e.g., based on item location information maintained in the item data store 720).

By using the server system 706 to retrieve and provide verification data (and optionally, other item data) as the data is used (and/or, in anticipation of the data being used), data updates can be centrally managed. For example, the retail environment 708 may include tens of thousands of different types of items 750, and the relevant verification data and other product information for such items can change over time. When changes occur, for example, the item data store 720 and/or the cart data store 710 can be updated, and the mobile device 702 and/or the shopping cart 704 can receive current data for particular items upon request. Thus, the data storage requirements of both the mobile device 702 and the shopping cart 704 can be reduced, along with an amount of data transmitted over the network(s).

Once the item data 734 has been retrieved and provided by the server system 706, for example, the mobile device 702 and/or the shopping cart 704 can receive the data 734, and can use the data 734 to verify whether the item 750 scanned by the mobile device 702 is actually added to the cart 704, according to item verification sensors of the cart 704. In general, item verification data of a particular type can be used by item verification sensors of a corresponding type to verify an item. For example, infrared (IR) verification data (e.g., data that defines a size/shape of an item, as detected by IR sensors when the item enters the cart 704) can be used to verify the item 750 according to the shopping cart's IR sensors. Example techniques for verifying an item according to IR sensor data are described in U.S. Application No. 63/276,386, which is herein incorporated by reference. As another example, sound verification data (e.g., data that defines a sound that the item produces when placed in the cart 704, as detected by sound sensors) can be used to verify the item 750 according to the cart's sound sensors (e.g., one or more microphones). As another example, weight verification data (e.g., data that defines a weight bump that the item generates when placed in the cart 704, as detected by weight sensors) can be used to verify the item 750 according to the cart's weight sensors (e.g., one or more scales). Example techniques for verifying an item according to weight sensor data are described in U.S. Application No. 63/276,474, which is herein incorporated by reference. Other types of item verification data and corresponding sensors are possible, and the various sensor types can be used singly or in combination with other sensors (and optionally, in combination with item location data) to verify scanned items. Item verification can include determining whether item verification data for a scanned item matches data collected by the corresponding sensors.

In some implementations, item location data can be used to verify an item. For example, the item data 734 can include item location data 724 (e.g., including one or more item locations 726 according to a planogram and/or a heat map of past item scans by other mobile device users) for the item 750. As items are scanned by multiple different users in the retail environment 708, potentially through the use of multiple different applications (e.g., customers using a shopping application, employees using an inventory application, etc.), location data for each item scan can be determined (e.g., based on wireless signal strength data, Global Positioning System (GPS) data, or other suitable location data provided through use of a scanning device) and can be stored (e.g., by the item data store 720) for use in aggregating and providing the item location data 724. In general, location data for an item that has been collected within a certain period of time (e.g., the past day, the past week, the past month, or another suitable period of time) can be used for aggregating and providing item location data. If an item becomes available at a new location, for example, the new location can eventually be recognized as a valid location for the item, as the item is scanned at the new location by multiple different users over time. Item verification can include determining whether a location of a current scan of an item matches a determined item location 726 for the item according to its item location data 724 (e.g., the current scan location is within a threshold distance of five feet, ten feet, twenty feet, or another suitable threshold distance of the determined item location). When the location of the current item scan matches the determined item location 726 according to its item location data 724, for example, the scanned item can be verified with a higher level of confidence, whereas the scanned item may be unverified (or verified with a lower level of confidence) when the location of the current item scan does not match the determined item location. By considering the location of a current item scan relative to a determined item location according to its item location data when verifying an item, for example, deceptive practices (e.g., switching a high-cost item with a low-cost item having a similar physical profile) can be potentially be detected and prevented.

In some implementations, once an item has been successfully or unsuccessfully verified, a user can be notified through output generated by the mobile device 702 and/or the shopping cart 704. In the present example, the mobile device 702 (shown here as device 702b) can add the selected item (e.g., one of items 750) to a virtual shopping cart maintained by the device 702 and/or servers 706, which can be presented to the user at interface 760. As another example, the shopping cart 704 can provide an indication (e.g., visual, sonic, and/or tactile) of successful and/or unsuccessful item verification.

In some implementations, a user may not be notified of an item being successfully or unsuccessfully verified. For example, item verification results can be maintained in association with a virtual shopping cart (e.g., with a scanned item being added to the cart, along with its verification status), without providing the item verification results to the user. By maintaining item verification results in the background in association with the user's virtual shopping cart, for example, a relatively uninterrupted shopping experience can be facilitated, while tracking the verification statuses of items that have been added to the cart. The verification statuses of each item in the virtual shopping cart can be aggregated, possibly with one or more other factors (e.g., a user's purchase history, a user's reputation score, etc.) to determine an overall verification status of the shopping cart 704. A high user reputation score, for example, can indicate a high level of virtual cart accuracy for the user for previous shopping trips (e.g., a virtual cart being shown to accurately represent the contents of a physical cart during checkout), whereas low reputation scores can indicate a low level of virtual cart accuracy for the user for previous shopping trips (e.g., a virtual cart being shown to not accurately represent the contents of a physical cart during checkout). The overall verification status of the shopping cart, for example, can be used as a factor in directing the user to an appropriate station during a checkout process.

During stage (C), a shopping cart may potentially be authorized for automated checkout. For example, the system 700 can perform operation 736, in which a determination of whether the user of the mobile device 702 (shown here as device 702c) and the shopping cart 704 (shown here as cart 704c) is authorized to proceed to an automated checkout station 770, or is to proceed to a manual checkout station 772. The automated checkout station 770, for example, can include RFID scanners, weight sensors, and/or high resolution cameras that can be used to determine whether the contents of the shopping cart 704, as tallied by the mobile device 702, correspond to what is being detected by the station 770. For example, the station 770 can measure the weight of the cart 704 and its contents, and determine whether the measured weight is within a threshold of the expected weight of the cart 770 and its contents, according to the mobile device tally. As another example, the station can use its RFID scanners to verify items with RFID tags that automated device sensors (e.g., IR scanners) are unable to verify with confidence. As another example, the station can use its cameras to capture one or more images of the cart 704 and its contents. If the cart 704 is validated across one or more of these signals, the customer may be automatically charged for the tallied contents and permitted to simply depart the retail environment 708. The manual checkout station 772, for example, can be a Point of Sale (POS) terminal at which items are removed from the shopping cart 704, an employee of the retail environment 708 individually scans the items to tally a total price, and the user provides a payment before departing the environment 708.

In general, determining whether a shopping cart is authorized for automated checkout can include determining a cart accuracy score for a virtual shopping cart, from verification results associated with items that have been placed in the shopping cart. Determining the cart accuracy score used for cart authorization, for example, can be based on a quantity of items in the cart (e.g., an absolute quantity, a percentage quantity, etc.) that have been verified, and/or an aggregated confidence score (e.g., averaged and/or weighted) for items in the cart. In some implementations, one or more additional authorization factors (e.g., a user's purchase history, a user's reputation score, etc.) can be considered when determining whether a shopping cart is authorized for automated checkout. For example, if a user is a regular customer of a store, and/or is a user of one or more additional services provided by the store (e.g., credit services, loyalty services, etc.), and/or has a high reputation score, a lower cart accuracy score may qualify the user for an automated checkout—whereas if the user is not a regular customer, and/or is not a user of additional services, and/or has a low reputation score, a higher cart accuracy may qualify the user for the automated checkout. In the present example, the shopping cart 704 is authorized for automated checkout (e.g., the virtual cart's accuracy score meets a threshold value), and the user is notified through output generated by the mobile device 702, which can be presented to the user at interface 762. At stage (D1), for example, the user can proceed with the mobile device 702 and the shopping cart 704 to the automated checkout station 770 to perform an automated checkout operation 738. However, if the shopping cart 704 were not to be authorized for automated checkout (e.g., the virtual cart's accuracy score does not meet a threshold value), the user would be notified through output generated by the mobile device 702, and at stage (D2), for example, the user could proceed with the mobile device 702 and the shopping cart 704 to the manual checkout station 772 to perform a manual checkout operation 740.

In some implementations, an additional item check may be performed after an automated checkout operation. For example, after the automated checkout operation 738 is performed on the shopping cart 704 (at stage (D1)), the user can be presented with further instructions (e.g., through output presented by the mobile device 702, through an indicator on the shopping cart 704, and/or through output presented by the automated checkout station 770) for completing the shopping trip. If the automated checkout station 770 confirms that the user's virtual shopping cart accurately represents the contents of the physical shopping cart 704, for example, the user's transaction can be finalized and the user can be permitted to depart the retail environment 708. If the automated checkout station 770 is unable to confirm that the user's virtual shopping cart accurately represents the contents of the physical shopping cart 704 within a threshold level of certainty, for example, an employee of the retail environment 708 can be directed to perform an additional item verification (e.g., by scanning one or more random items, high value items, and/or specifically unverified items in the shopping cart 704). If the shopping cart 704 passes the additional item verification, for example, the user's transaction can be finalized and the user can be permitted to depart the retail environment 708. If, however, the shopping cart 704 does not pass the additional item verification, for example, the user can be directed to the manual checkout station 772 to perform the manual checkout operation 740. Similarly, if the automated checkout station 770 determines that the user's virtual shopping cart does not accurately represent the contents of the physical shopping cart 704 (e.g., one or more items were detected by the automated checkout station 770 as being in the shopping cart 704 that are not in the user's virtual shopping cart), the user can be directed to the manual checkout station 772 to perform the manual checkout operation 740.

In some implementations, upon completion of a shopping trip, a user's transaction may be automatically finalized and the user may be permitted to depart without first proceeding to an automated checkout station or a manual checkout station. For example, if a virtual cart's accuracy score meets a threshold value and one or more additional authorization factors pertain to the user (e.g., the user's reputation score meets a threshold value and/or the user subscribes to a loyalty program and/or uses credit services of the store), the user can be provided with a notification (e.g., on the mobile device 702 and/or the shopping cart 704) to confirm the transaction. After the user's transaction for the shopping trip is finalized, for example, the user can be permitted to simply depart the store. Example techniques for determining whether a shopping cart is authorized for automated checkout and verifying items by an automated checkout system are described in U.S. Application No. 63/276,471, which is herein incorporated by reference.

Figure 8:
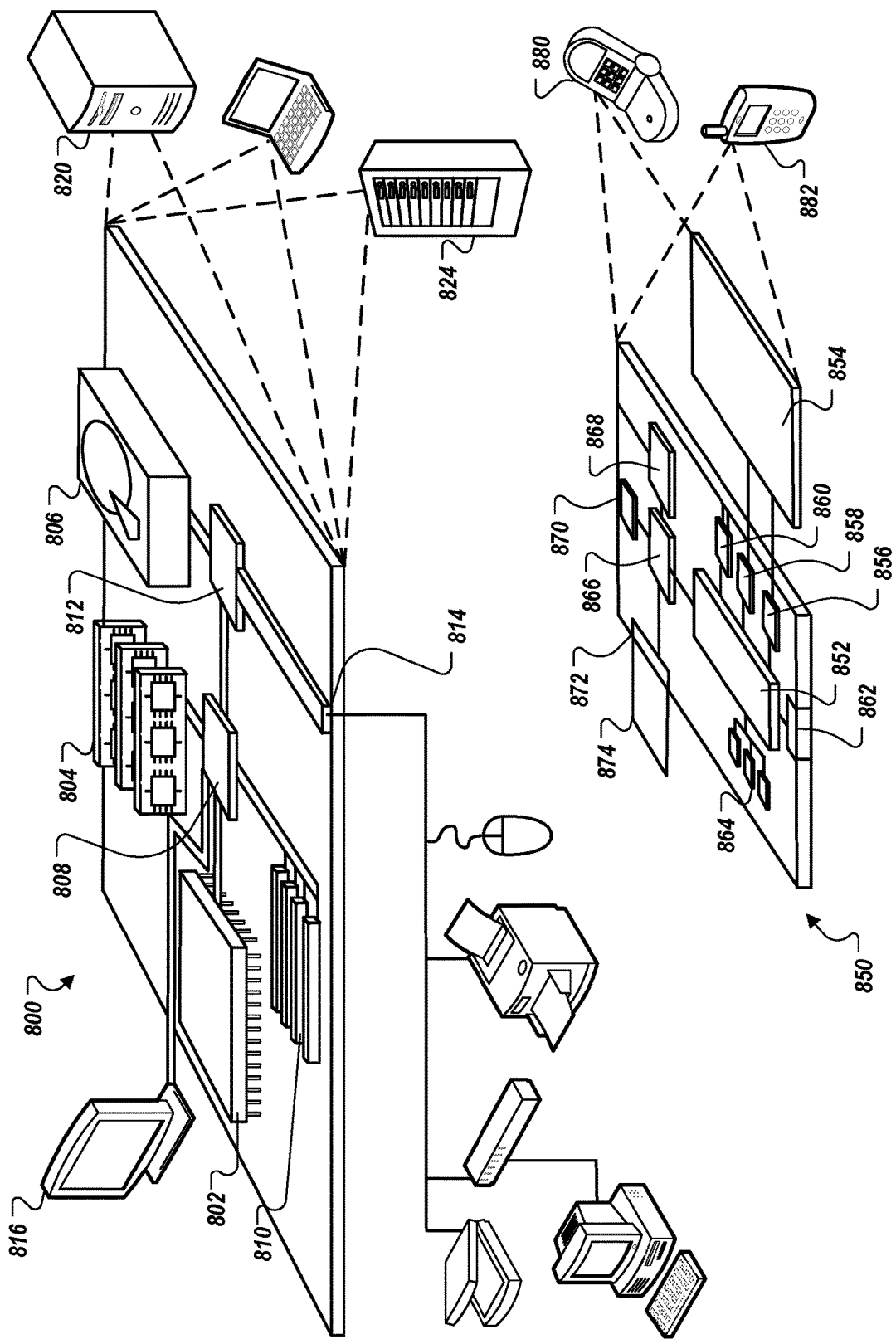
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various buses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for validating products that are placed in a shopping cart, the system comprising:
a shopping cart configured to retain one or more products and to be operated by a user in a retail environment, wherein the shopping cart includes product validation hardware and a controller, wherein the product validation hardware includes a plurality of motion sensors positioned at least along a top perimeter of the shopping cart and at least one sound sensor positioned inside the shopping cart, wherein the shopping cart is configured to perform operations comprising:
receiving, from one or more of the plurality of motion sensors, motion data when a product enters a top horizontal plane of the shopping cart;
receiving, from the at least one sound sensor, audio data that is collected in real-time as the product is placed in the shopping cart; and
correlating the audio data with the motion data to generate an audio signature over time for the product, wherein the audio signature is used to validate the product that is placed in the shopping cart.

2. The system of claim 1, further comprising a mobile device in communication with at least one of the product validation hardware and the controller of the shopping cart, wherein the mobile device is configured to perform operations comprising:
receiving user input indicating a scan of the product to be placed in the shopping cart;
identifying a unique identifier for the product based on the scan; and
retrieving, from a data store and based on the unique identifier, product information for the product, wherein the product information comprises information that identifies one or more expected audio signatures for the product.

3. The system of claim 2, wherein the mobile device is configured to perform operations further comprising:
receiving, from the shopping cart, the audio signature over time for the product;
comparing the audio signature to at least one expected audio signature of the one or more expected audio signatures for the product to determine whether the audio signature is within a predetermined threshold range of the at least one expected audio signature; and
generating, based on determining that the audio signature is within the predetermined threshold range of the at least one expected audio signature, output indicating that the product placed in the shopping cart is validated.

4. The system of claim 3, wherein comparing the audio signature to the at least one expected audio signature includes:
comparing a measured amplitude of the audio signature for a time interval and a frequency bin, with a corresponding expected amplitude of the audio signature for the time interval and the frequency bin.

5. The system of claim 2, wherein:
the mobile device is configured to transmit, to the shopping cart, the product information of the product, and
the shopping cart is further configured to perform operations comprising:
comparing the audio signature to at least one expected audio signature of the one or more expected audio signatures for the product to determine whether the audio signature is within a predetermined threshold range of the at least one expected audio signature; and
generating, based on determining that the audio signature is within the predetermined threshold range of the at least one expected audio signature, output indicating that the product placed in the shopping cart is validated.

6. The system of claim 1, wherein the shopping cart is further configured to poll the at least one sound sensor for audio data based on receiving the motion data from the one or more of the plurality of motion sensors.

7. A system for validating products that are placed in a shopping cart, the system comprising:
a shopping cart configured to retain one or more products and to be operated by a user in a retail environment, wherein the shopping cart includes product validation hardware and a controller, wherein the product validation hardware includes a plurality of motion sensors positioned at least along a top perimeter of the shopping cart and at least one sound sensor positioned inside the shopping cart; and
a mobile device in communication with at least one of the product validation hardware and the controller of the shopping cart, wherein the mobile device is configured to perform operations comprising:
receiving user input indicating a scan of a product to be placed in the shopping cart;
identifying a unique identifier for the product based on the scan;
retrieving, from a data store and based on the unique identifier, product information for the product; and
transmitting, to the controller, the product information, wherein the controller of the shopping cart is configured to perform operations comprising:
receiving, from the mobile device, the product information;
receiving, from one or more of the plurality of motion sensors, motion data when the product enters a top horizontal plane of the shopping cart;
receiving, from the at least one sound sensor, audio data that is collected in real-time as the product is placed in the shopping cart;
correlating the audio data with the motion data to generate correlated data;
comparing the correlated data to the product information of the product to determine whether the correlated data is within a predetermined threshold range of the product information; and
generating, based on determining that the correlated data is within the predetermined threshold range of the product information, output indicating that the product placed in the shopping cart is validated.

8. The system of claim 7, wherein correlating the audio data with the motion data includes determining a velocity of the product based on the motion data, wherein the motion data includes at least one of position translation data, rotational data, and movement data of the product as it enters the shopping cart and settles inside the shopping cart.

9. The system of claim 7, wherein the correlated data is generated based on applying a machine learning trained model to the audio data and the motion data, wherein the model was trained using a process comprising:
receiving training data for one or more other products that includes audio data, motion data, other sensor data, and positive product data correlations;
training the model to correlate the received training data for the one or more other products; and
outputting the model for runtime use.

10. The system of claim 7, wherein the product information includes information that identifies an expected audio signature for the product.

11. The system of claim 10, wherein correlating the audio data with the motion data to generate correlated data comprises adjusting the audio data based on the expected audio signature for the product.

12. The system of claim 7, wherein the motion data is received at a first time and the audio data is received at a second time.

13. The system of claim 7, wherein the controller is configured perform operations further comprising:
polling the at least one sound sensor for audio data based on receiving the motion data from the one or more of the plurality of motion sensors.

14. The system of claim 7, wherein the mobile device is configured to perform operations further comprising:
receiving the output indicating that the product placed in the shopping cart is validated; and receiving user input indicating a scan of another product that is to be placed in the shopping cart.

15. The system of claim 7, wherein the mobile device is configured to perform operations further comprising:
    receiving the output indicating that the product placed in the shopping cart is validated; and
    completing a checkout process at the mobile device.

16. The system of claim 7, wherein the controller is configured to perform operations further comprising:
    generating output indicating that the product placed in the shopping cart is not validated, based on determining that the correlated data is not within the predetermined threshold range of the product information.

17. The system of claim 16, wherein the output is used for presenting a notification to the user at the mobile device, wherein the notification prompts the user to (i) rescan the product that was placed in the shopping cart or (ii) put a correct product that corresponds to the product in the shopping cart.

18. The system of claim 16, wherein the controller is configured to perform operations further comprising:
    generating instructions that, when executed at the mobile device, prevent the user from continuing to scan products with the mobile device until the product that was placed in the shopping cart is validated, based on determining that the correlated data is not within the predetermined threshold range of the product information.

19. The system of claim 7, wherein the mobile device is configured to perform operations further comprising:
    identifying the unique identifier for the product, based on the scan; and
    transmitting the unique identifier to the controller; and
    wherein the controller is configured to perform operations further comprising:
    retrieving, from the data store and based on the unique identifier, the product information for the product.

20. The system of claim 7, wherein the mobile device is configured to perform operations further comprising:
    receiving the correlated data from the controller and comparing the correlated data to the product information of the product to determine whether the correlated data is within the predetermined threshold range of the product information.

* * * * *